United States Patent [19]

Ogura

[11] Patent Number: 5,512,979
[45] Date of Patent: Apr. 30, 1996

[54] SYSTEM FOR REMOTE DIAGNOSIS OF IMAGE FORMING APPARATUSES, INCLUDING INTELLIGENT COMMUNICATIONS CONTROL FOR DATA THEREFROM

[75] Inventor: Masaaki Ogura, Kawasaki, Japan

[73] Assignee: Ricoh Co., Ltd., Tokyo, Japan

[21] Appl. No.: 280,921

[22] Filed: Jul. 25, 1994

[30] Foreign Application Priority Data

Jul. 26, 1993 [JP] Japan .................................. 5-203591

[51] Int. Cl.$^6$ ................................................ G03G 15/00
[52] U.S. Cl. .................................. 355/204; 379/106
[58] Field of Search .............................. 355/204, 206, 355/202, 207; 364/138; 379/106

[56] References Cited

U.S. PATENT DOCUMENTS

| | | | |
|---|---|---|---|
| 4,455,453 | 6/1984 | Parasekvakos et al. | 379/106 X |
| 5,300,980 | 4/1994 | Maekawa et al. | 355/204 |
| 5,386,271 | 1/1995 | Maekawa et al. | 355/204 |

FOREIGN PATENT DOCUMENTS

| | | |
|---|---|---|
| 1-100562 U | 7/1989 | Japan. |
| 1-100561 U | 7/1989 | Japan. |
| 1-103950 U | 7/1989 | Japan. |
| 2-259666 | 10/1990 | Japan. |
| 2-257155 | 10/1990 | Japan. |
| 3-196053 | 8/1991 | Japan. |

*Primary Examiner*—Joan H. Pendergrass
*Attorney, Agent, or Firm*—Oblon, Spivak, McClelland, Maier & Neustadt

[57] ABSTRACT

A remote diagnosis apparatus comprising communication control units which store particular data sent from a plurality of copying machines and execute communication control for the data and a controller which is connected via a public line network to the communication control units and into which data stored in the communication control units is inputted to be stored therein, the communication control units comprising a counter counting times of recalling, and a control means for sending a call again in a state where particular data can not be transmitted and setting a particular value in the counter when new data to be transmitted is received while waiting for an opportunity to send a call again.

11 Claims, 49 Drawing Sheets

Remote message with a remote message key

Access to a copying machine from a controller

Access to a copying machine from a controller

Access to a copying machine from a controller

Access to a communication control unit from a controller

Access to a communication control unit from a copying machine

Read processing

FIG. 14A

Example of data format for remote message

Message data from a copying machine to a communication control unit

| Message reason code | Times of jam generation | | | Times of generation of abnormality in self diagnosis | | | | Number of used copy paper | | | | State of a copying machine | | | |
|---|---|---|---|---|---|---|---|---|---|---|---|---|---|---|---|
| | Total | Section A | Section B | ... | Total | Type A | Type B | ... | Total | Size A | Size B | ... | State A | State B | State C | ... |
| 1401 | 1402 | | | | 1403 | | | | 1404 | | | | 1405 | | | |

FIG. 14B

Message data from a communication control unit to a controller

| Machine type number | Serial number | Message reason code | Times of generation of abnormality in self diagnosis | | | | State of a copying machine | | | |
|---|---|---|---|---|---|---|---|---|---|---|
| | | | Total | Type A | Type B | ... | State A | State B | State C | ... |
| 1406 | 1407 | 1408 | 1409 | | | | 1410 | | | |

Time of occurrence 1411

FIG. 14C

Report of a result of messaging from a communication control unit to a copying machine

| Message result report code | Contents of message result report |
|---|---|
| 1412 | 1413 |

FIG. 15A

Data format for access from a controller to a copying machine

Read processing

From a controller to a communication control unit

| Machine type number | Serial number | Read request code | Item code |
|---|---|---|---|
| 1501 | 1502 | 1503 | 1504 |

From a communication control unit to a controller

| Machine type number | Serial number | Read response code | Item code | Read data |
|---|---|---|---|---|
| 1510 | 1511 | | | |

From a communication control unit to a copying machine

| Read request code | Item code |
|---|---|
| 1505 | 1506 |

From a copying machine to a communication control unit

| Read response code | Item code | Read data |
|---|---|---|
| 1507 | 1508 | 1509 |

FIG. 15B

Data format for access from a controller to a copying machine

Write processing

From a controller to a communication control unit

| Machine type number | Serial number | Write request code | Item code | Data to be written |
|---|---|---|---|---|

From a communication control unit to a controller

| Machine type number | Serial number | Write response code | Item code | Written data |
|---|---|---|---|---|
| | | | 1514 | 1515 |

From a communication control unit to a copying machine

| Write request code | Item code | Data to be written |
|---|---|---|
| | 1512 | 1513 |

From a copying machine to a communication control unit

| Write response code | Item code | Written data |
|---|---|---|
| | | 1516 |

FIG. 15C

Data format for access from a controller to a copying machine

Execute processing

From a controller to a communication control unit

| Machine type number | Serial number | Execute request code | Item code | Supplement to operational contents |
|---|---|---|---|---|

From a communication control unit to a controller

| Machine type number | Serial number | Execute response code | Item code | Operation result data |
|---|---|---|---|---|

From a communication control unit to a copying machine

| Execute request code | Item code | Supplement to operational contents 1517 / 1518 |
|---|---|---|

From a copying machine to a communication control unit

| Execute response code | Item code | Operation result data 1519 |
|---|---|---|

FIG. 16A

Data format for access from a controller to a communication control unit

Read processing

Access to a communication control unit

1601 — | Communication control unit code | Read request code | Item code |

Response from a communication control unit

1602 — | Communication control unit code | Read response code | Item code | Read data |

FIG. 16B

Data format for access from a controller to a communication control unit

Write processing

Access to a communication control unit

1603 — | Communication control unit code | Write request code | Item code | Data to be written |

Response from a communication control unit

1604 — | Communication control unit code | Write response code | Item code | Written data |

FIG. 16C

Data format for access from a controller to a communication control unit

Execute processing

Access to a communication control unit

1605 — | Communication control unit code | Execute request code | Item code | Supplement to operational contents |

Response from a communication control unit

1606 — | Communication control unit code | Execute response code | Item code | Operation result data |

FIG. 17
Data format for access from a communication control unit to a copying machine
Access from a communication control unit to a copying machine
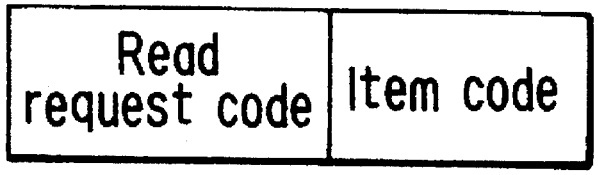
Response from a copying machine to a communication control unit
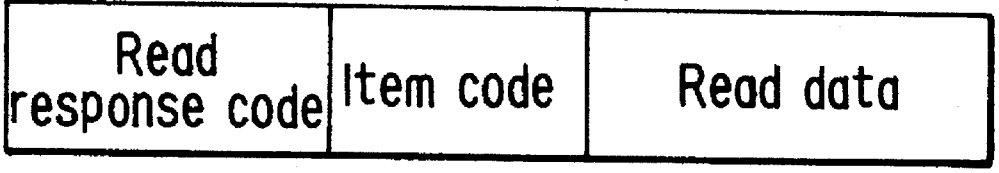

| Code | Name | Function |
|------|------|----------|
| 501 | Remote message key | Pressed down when it is necessary to send a remote message. |
| 502 | Remote message displayed | Lit up during remote messaging operation. |
| 503 | Timer key | Pressed down to set time for a timer. |
| 504 | Timer display | Lit up when a timer is set, or when the timer is working. |
| 505 | Program key | Pressed down for storing a program or for calling. |
| 506 | Program display | Lit up when a program is being used. |
| 507 | Enter key | Pressed down for dimensional change, editorial function, or program number setting. |
| 508 | Ten-key | Pressed down for setting a number of paper to be copied dimensional change, setting a space width with fro binding, program setting, or for program number setting. |
| 509 | Guidance key | Pressed down to display a method of copying or explanation of how to operate each key in the guidance display section. |
| 510 | Guidance key display | Lit up when guidance is being used. |
| 511 | Display panel | Various information is displayed. |
| 512 | Dimensional change key | Lit up when dimensions of a test are entered. |
| 513 | Dimensional change display | Lit up when dimensional change has been selected. |
| 514 | Centering key | Pressed down to move an image to be copied to a central position. |
| 515 | Centering display | Lit up when centering function has been selected. |
| 516 | Binding space adjust key | Pressed down to prepare a space for binding in both the right and left side of copy paper. |
| 517 | Binding space display | Selected binding space is displayed. |
| 518 | Double side display | Lit up when double side copy is selected. |
| 519 | Sort display | Lit up in a sort state when a sorter is being used. |
| 520 | Stack display | Lit up in a stack state when a sorter is being used. |

FIG.37

| Code | Name | Function |
|---|---|---|
| 521 | Sorter key | Pressed down when a sorter is used. |
| 522 | Double side key | Pressed down to print out a double side copy. |
| 523 | Successive page display | Lit up when pages are copied successively. |
| 524 | Successive page display key | Pressed down when automatically copying a spread text side by side, and also when automatically copying a double-sided text face by face. It should be noted that an optional ADF is required for copying a double-sided text. |
| 525 | Delete display | Lit up when the edit/copy function has been selected. |
| 526 | Delete key | Pressed down to delete an area inside or outside of a frame, and also to delete the frame itself. |
| 527 | Size change display with form specified | Lit up when size-changed copy with form specified has been selected. |
| 528 | Size change key with form specified | Pressed down when size-changed copy with form specified has been selected. |
| 529 | Zoom change key | Pressed down when selecting magnification of a copy. |
| 530 | Compression key | Pressed down for copying a text with a reduced size. |
| 531 | Enlarge key | Pressed down for copying a text with an enlarged size. |
| 532 | Original size key | Pressed down to restore original size. |
| 533 | Form selection key | Pressed down to select a form for copying. |
| 534 | Automatic form selection key | Pressed down for automatic selection of form. |
| 535 | Temperature adjust key | Pressed down to adjust tone of a copied image. |
| 536 | Automatic density key | Pressed down to select the automatic density adjustment mode. |
| 537 | Clear/Stop key | Pressed down when changing a number of copy paper to be set, for stopping continuous copy on the way, or for setting a program number. |
| 538 | Start key | Pressed down to start copying. |
| 539 | Interrupt key | Pressed down to produce an interruption copy. |
| 540 | Preheat display | Lit up when preheat still remains. |
| 541 | Mode clear key | Pressed down to return various modes to a standard mode, to switch the preheat state to the normal state, and for setting a program number. |

| Function | | Length | |
|---|---|---|---|
| Copying machine at address 1 (601) | Machine type number | 6 | |
| | Serial number | 10 | |
| | Check sum for the above factors | 4 | |
| Copying machine at address 2 (602) | Machine type number | 6 | |
| | Serial number | 10 | |
| | Check sum for the above factors | 4 | |
| Copying machine at address 3 (603) | Machine type number | 6 | |
| | Serial number | 10 | |
| | Check sum for the above factors | 4 | |
| Copying machine at address 4 (604) | Machine type number | 6 | |
| | Serial number | 10 | |
| | Check sum for the above factors | 4 | |
| Copying machine at address 5 (606) | Machine type number | 6 | |
| | Serial number | 10 | |
| | Check sum for the above factors | 4 | |
| Remote message with a remote message key | Telephone number of a receiver of the message | 32 | (For the message key) |
| | Redial times setting | 2 | (First counter) |
| | Redial times counter | 2 | (Second counter) |
| | Redial time interval | 3 | |
| | Data transmission allowable or not when sending a message to a controller — Times of generation of jamming | 1 | |
| | Times of generation of abnormality in self diagnosis | 1 | |
| | Number of copies | 1 | |
| | Copying state | 1 | |
| | Check sum for the above factors | 4 | |
| Remote message due to abnormality in self diagnosis | Telephone number of a receiver of the message | 32 | (For the message key) |
| | Redial times setting | 2 | (First counter) |
| | Redial times counter | 2 | (Second counter) |
| | Redial time interval | 3 | |
| | Data transmission allowable or not when sending a message to a controller — Times of generation of jamming | 1 | |
| | Times of generation of abnormality in self diagnosis | 1 | |
| | Number of copies | 1 | |
| | Copying state | 1 | |
| | Check sum for the above factors | 4 | |
| Remote message due to pre-warning | Telephone number of a receiver of the message | 32 | (For warning) |
| | Redial times setting | 2 | (First counter) |
| | Redial times counter | 2 | (Second counter) |
| | Redial time interval | 3 | |
| | Data transmission allowable or not when sending a message to a controller — Times of generation of jamming | 1 | |
| | Times of generation of abnormality in self diagnosis | 1 | |
| | Number of copies | 1 | |
| | Copying state | 1 | |
| | Timer for sending a message to a controller | 4 | |
| | Check sum for the above factors | 4 | |
| Total counter value automatic communication processing | Time for collection of counter values for total number of used copy paper | 4 | |
| | Telephone number of a receiver of the message | 32 | |
| | Date and time for sending the message (Date : Hour : Minute) | 6 | |
| | Check sum for the above factors | 4 | |
| Telephone mode setting | Dial mode setting | 1 | |
| | Dial pulse interval setting | 1 | |
| | Check sum for the above factors | 4 | |

SYSTEM FOR REMOTE DIAGNOSIS OF IMAGE FORMING APPARATUSES, INCLUDING INTELLIGENT COMMUNICATIONS CONTROL FOR DATA THEREFROM

FIELD OF THE INVENTION

The present invention relates to a remote diagnosis apparatus which provides centralized control over data for an image forming apparatus via a communication line, and more particularly to a remote diagnosis apparatus to which an image forming apparatus such as a copying machine or a printer and a data control unit are connected via a communication line and which enables access to data for an image forming apparatus from the data control unit even if power for the image forming apparatus is OFF.

BACKGROUND OF THE INVENTION

There has been a system in which enables online connection of an image forming apparatus such as a copying machine to a controller installed at a site such as a service center making use of the public line network. This system provides centralized control over a plurality of copying machines installed at remote sites with a host machine installed at a site and uses the data obtained from the copying machines for collecting data for usage of each copying machine or for maintenance of each copying machine. As contents of the maintenance, such operations as an automatic call from a self diagnosis function in a copying machine to a controller or adjusting each section of a copying machine by accessing each copying machine from the controller are executed. Also in the past, a count (generally a number of sheets of copy paper) for accounting to a customer in relation to the maintenance contract for a copying machine usually checked by way of visit by a service engineer to the customer or calling the customer through a telephone system has been read by means of remote operation using the above system.

Furthermore there has been proposed a system constructed so that, when transmitting data concerning each copying machine through the public line network to a controller, if it is impossible to transmit the data because, for instance, another system occupies the line, transmission of data is automatically retried up to a previously specified number of times to transmit data.

As the reference technological documents concerning the conventional technologies as described above, there are, for instance, Japanese Utility Model Laid Open Publication No.100561/1989 disclosing the "copying machine allowing remote and automatic inspection of a meter through a telephone", Japanese utility Model Laid Open Publication No.100562/1989 disclosing the "network control system for automatic inspection of a meter of a number of copy paper", and Japanese Utility Model Laid Open Publication No.103950/1989 disclosing the "copying machine allowing remote and automatic inspection of a meter through a telephone".

In addition, as a system in which various types of data concerning a copying machine are transmitted and received, there is the "system for collection of data concerning an image forming apparatus" disclosed in Japanese Patent Laid Open Publication No.257155/1990, and furthermore as a system for periodically transmitting data for a copying machine, there is the "system for collection of data concerning an image forming apparatus" disclosed in Japanese Patent Laid Open Publication No.259666/1990. Furthermore as a system for receiving a remote control signal through a communication line and executing processing according to the remote signal, there is the "image forming apparatus" disclosed in Japanese Patent Laid Open Publication No.196053/1991.

In the conventional systems as described above, however, times for recall are limited, for instance, to 5 times, and at a point of time when the fourth recall is finished, if new data to be transmitted is generated, only one opportunity for recall is given even to the new data together with the old data, and the recall function is inappropriate for transmitting the new data.

SUMMARY OF THE INVENTION

It is an object of the present invention to make the recall function work without fail even to the new data generated while waiting for a chance for recall by resetting times of recall to the maximum times if new data to be transmitted is generated while waiting a chance for recall of old data in a system having a function to recall when the system is in a state where particular data can not be transmitted.

A remote diagnosis apparatus according to the present invention automatically recalls when data concerning an image forming apparatus can not be sent to the receiving side and resets a prespecified value in a counter which counts times of recall if new data to be transmitted to the receiving side is generated while waiting for a chance of recalling the existing data, so that recall of the new data generated while waiting for a chance for recall is executed accurately and without fail.

Also the remote diagnosis system according to the present invention has a first counter set up by a control means via a communication control means and a second counter for counting times of executed call, so that, if new data to be transmitted to the receiving side is generated, times for recall is set up anew by shifting a value in the first counter to the second counter, or the remote diagnosis system has a summing counter as the second counter, so that, if new data to be transmitted to the receiving side is generated, recall of the new data generated while waiting for a chance for recall is executed without fail by resetting the second counter.

Other objects and features of this invention will become understood from the following description with reference to the accompanying drawings.

BRIEF DESCRIPTION OF THE DRAWINGS

FIG. 14A is an explanatory view illustrating an example of data format for remote message according to the present invention;

FIG. 14B is an explanatory view illustrating an example of data format for remote message according to the present invention;

FIG. 14C is an explanatory view illustrating an example of data format for remote message according to the present invention;

FIG. 15A is an explanatory view illustrating an example of data format for accessing a copying machine from the controller according to the present invention;

FIG. 15B is an explanatory view illustrating an example of data format for accessing a copying machine from the controller according to the present invention;

FIG. 15C is an explanatory view illustrating an example of data format for accessing a copying machine from the controller according to the present invention;

FIG. 16A is an explanatory view illustrating an example of data format for accessing a copying machine from the communication control unit according to the present invention;

FIG. 16B is an explanatory view illustrating an example of data format for accessing a copying machine from the communication control unit according to the present invention;

FIG. 16C is an explanatory view illustrating an example of data format for accessing a copying machine from the communication control unit according to the present invention;

FIG. 17 is an explanatory view illustrating an example of data format for accessing a copying machine from the communication control unit according to the present invention;

FIG. 36 is a table showing keys in each operational display sections as well as display state according to the present invention;

FIG. 37 is a table showing parameters set in a communication control unit according to the present invention;

FIG. 38 is a table showing parameters set in the communication control unit according to the present invention;

DESCRIPTION OF THE PREFERRED EMBODIMENTS

Figure 1:
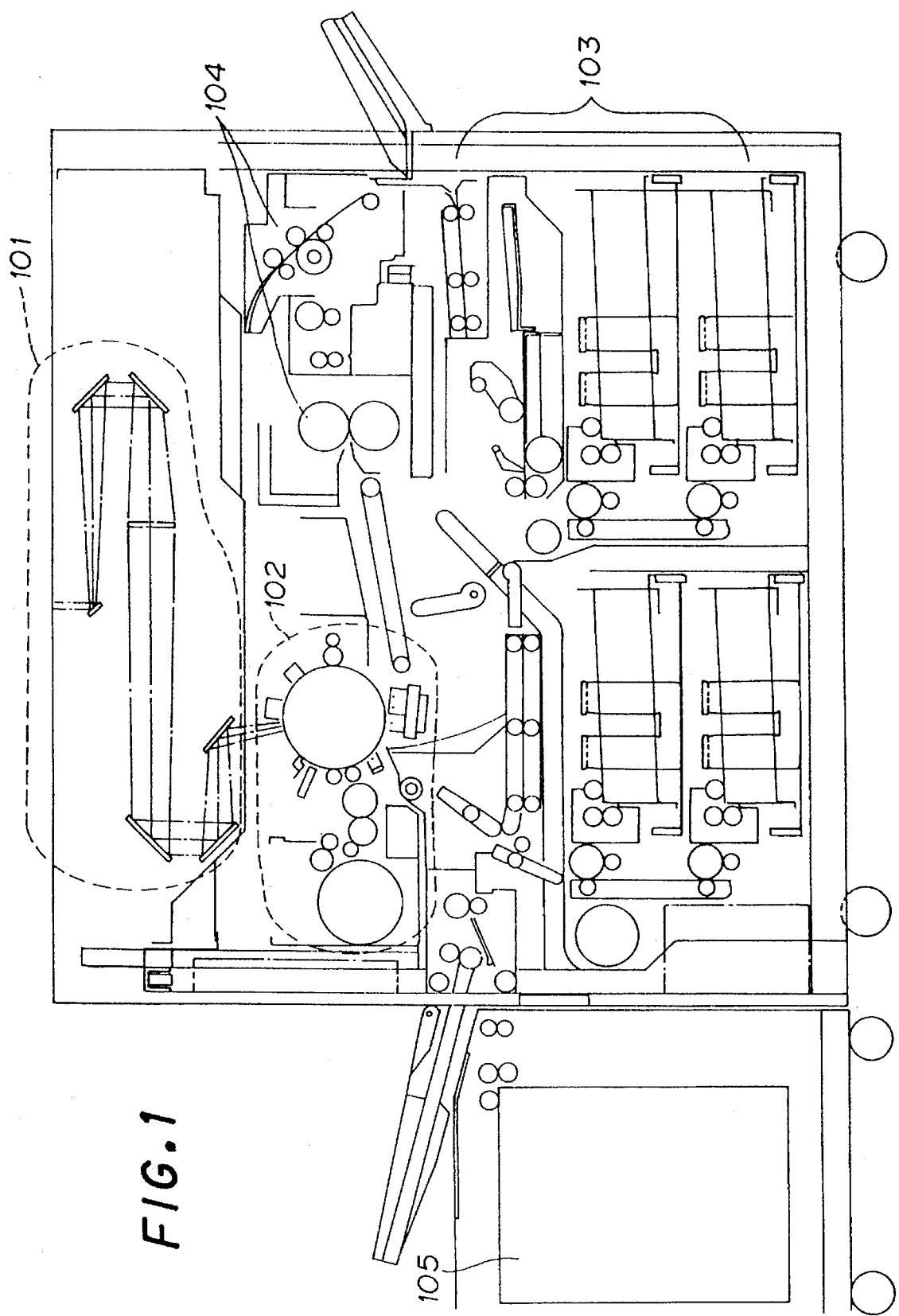
FIG. 1 is an explanatory view for explanation of a structure of a copying machine in which the present invention is applied.

Detailed description is made for embodiments of a remote diagnosis apparatus according to the present invention with reference to the attached drawings. FIG. 1 is an explanatory view illustrating a schematic configuration of a copying machine in which the present invention is applied. The present invention comprises a text (or draft) read system 101, an image forming system 102, a paper feed system 103, fixing/paper discharge system 104, and an optionally installed LCT (large volume paper feed unit) 105, and in addition has such components as an operational display section and an electric instrument control system (not shown herein).

Figure 2:
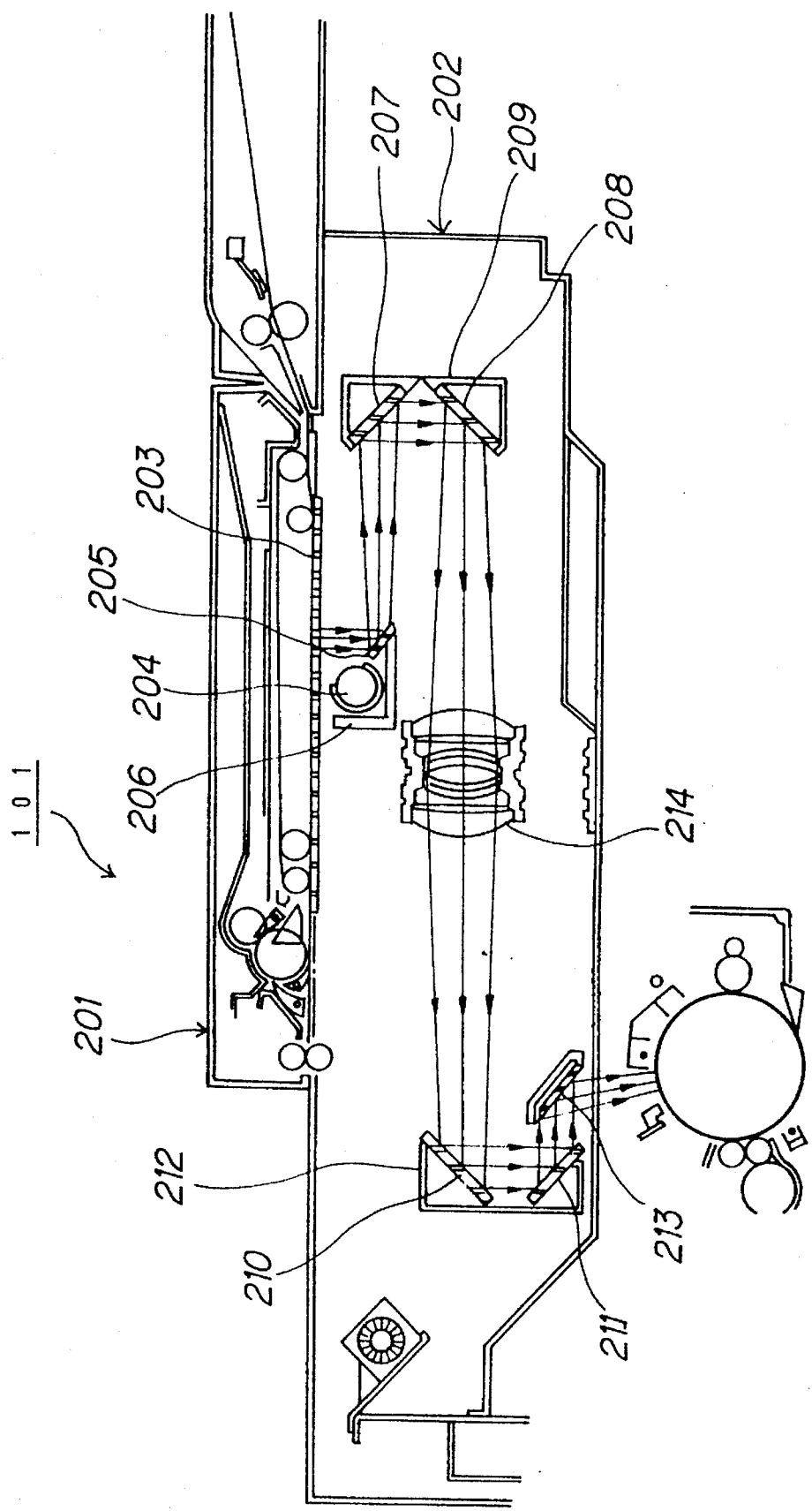
FIG. 2 is an explanatory view illustrating detailed structure of a draft read system in a copying machine in which the present invention is applied.

Now detailed description is made for configuration of the draft read system 101, image forming system 102, paper feed system 103, and operation display system described above in this order. FIG. 2 is an explanatory view illustrating detailed structure of the draft read system 101 comprising an ADF (automatic document feeder) 201 which automatically feeds a set draft, and an optical unit 202 which injects light onto a draft and forms an optical image thereof. The ADF 201 is on/off switchably mounted on a draft mount surface, and comprises such components as a draft set table, a carrier roller, and a carrier belt.

The optical unit 202 has a contact glass 203 on which a draft is placed, a first scanner 206 integrated with an exposure illumination unit (fluorescent lamp) 204 as well as with the first mirror 205, a second scanner 209 integrated with a second mirror 207 and a third mirror 208, a third scanner 212 integrated with a fourth mirror 210 and a fifth mirror 211, a sixth mirror 213, and a lens 214 all packaged in a housing.

Figure 3:
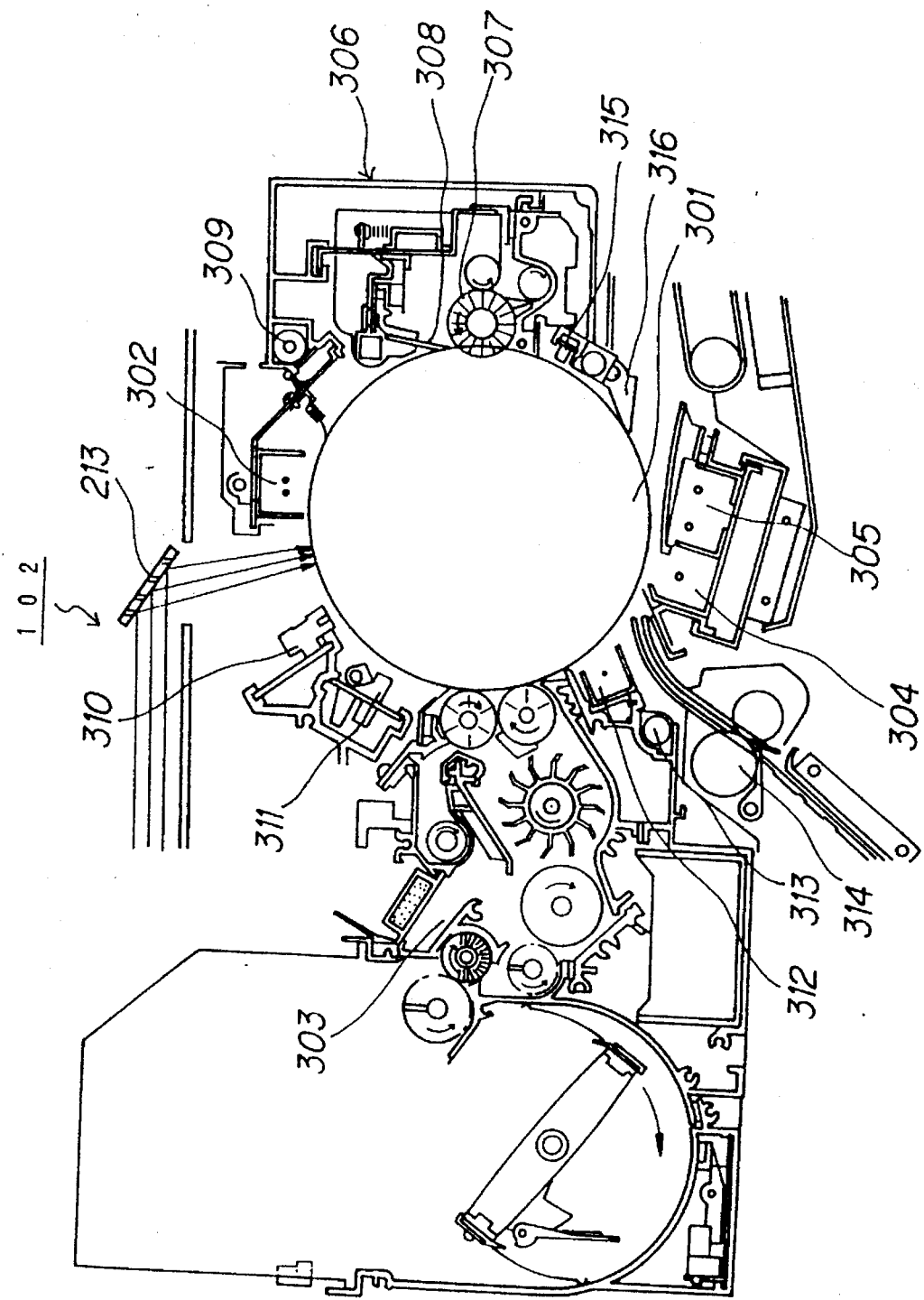
FIG. 3 is an explanatory view illustrating detailed structure of an image forming system in a copying machine in which the present invention is applied.

FIG. 3 is an explanatory view illustrating a detailed structure of the image forming system 102. The image forming system 102 comprises various processing units based on a conventional type of electrophotographic system. Namely in this figure, designated at the reference numeral 301 is a photosensitive drum for forming an electrostatic latent image, at 302 an electrifying charger which homogeneously electrifies a surface of the photosensitive drum 301 by means of corona discharge, at 303 a development unit which stores toner therein and executes development processing by depositing toner on the photosensitive drum 301 according to a development process, at 304 a transfer charger which executes a transfer processing by means of corona discharge, and at 305 a separating charger which separates recording paper closely adhered to the photosensitive drum 301 by means of corona discharge.

Also designated at the reference numeral 306 is a cleaning unit which removes and recovers residual toner remaining after the transfer processing above on the surface of the photosensitive drum 301 with a fur brush 307 and a cleaning blade 30S, at 309 a quenching lamp which deletes residual electric charge remaining on the surface of the photosensitive drum 301, at 310 an eraser which optically deletes electric charge outside a text read size or outside an effective image area, at 311 an electric potential sensor which measures a surface electric potential on the surface of the photosensitive drum 301 and feeds back the result of measurement, at 312 a PTC (pre-transfer charger) which removes electric charge before the transfer processing by means of corona discharge, at 313 a PTL (pre-transfer lamp) which optically removes electric charge before the transfer processsing, at 314 a resist roller which feeds record paper adjusting the timing according to an image formed on the photosensitive drum 301, at 315 a P-sensor (toner density sensor) which optically detects a density of a pattern formed on the photosensitive drum 301 and feeds back the result of detection as a toner density, and at 316 a separation claw which contacts the surface of the photosensitive drum 301 with a fine pressure to separate a tip of recording paper as well as to prevent the recording paper from being wound up.

Figure 4:
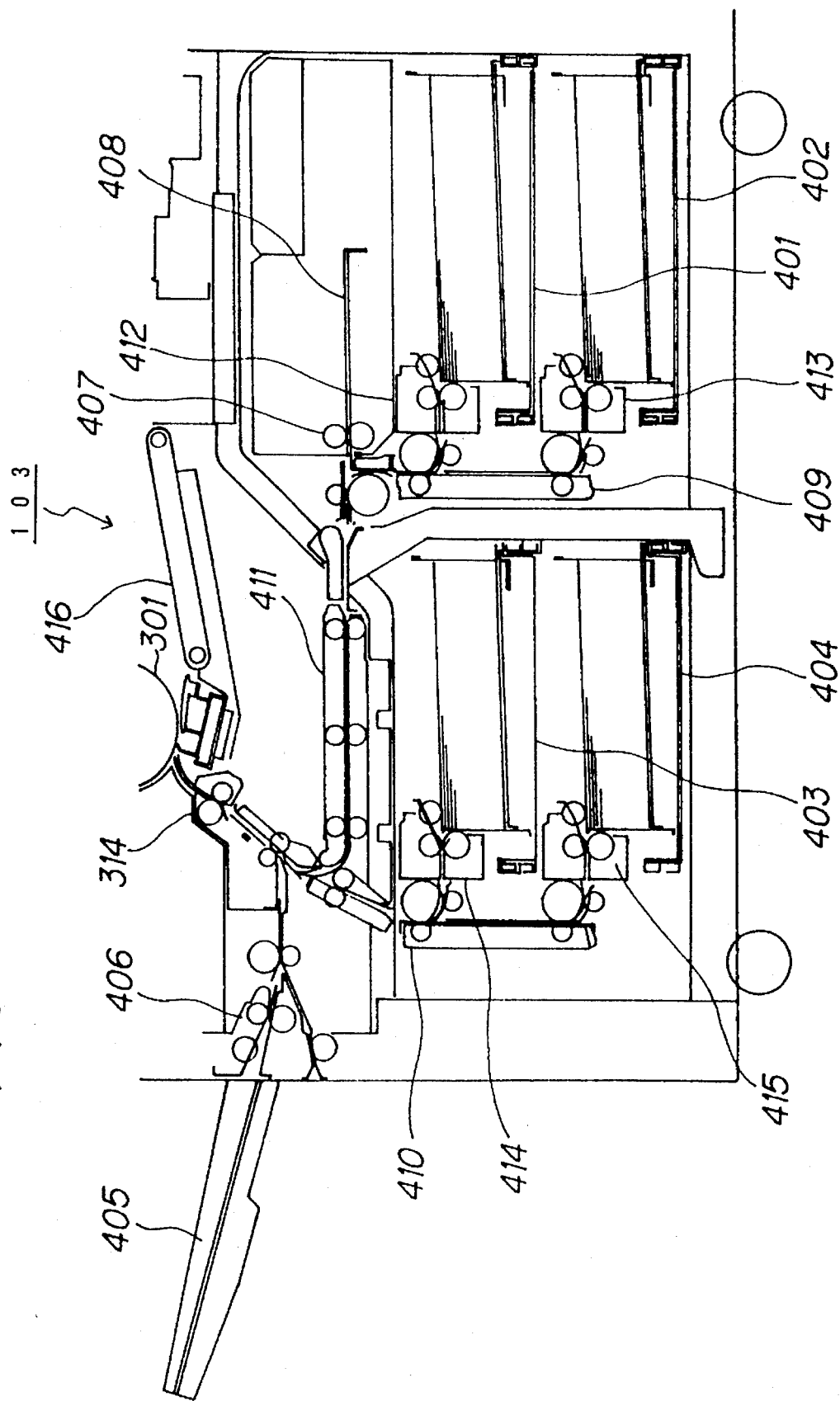
FIG. 4 is an explanatory view illustrating detailed structure of a paper feed system in a copying machine in which the present invention is applied.

FIG. 4 is an explanatory view illustrating a detailed structure of the paper feed system 103 constituting a lower section of the present copying machine. In this figure, designated at the reference numerals 401 to 404 are paper feed trays each used to place a plurality sheets of paper thereon and also each drawable frontward, at 405 a manual paper feed table to set recording paper one by one when an irregular size of paper is used or for interruption copy, at 406 a manual paper feed unit, at 407 a double-sided paper feed unit, and at 408 a double-sided tray. Namely the paper feed section has 2 rows of paper feed trays each row consisting of 2 stages comprising paper feed trays 401 to 404 respectively, and comprises the manual paper feed unit 406 and the double-sided paper feed unit 407.

Also a right vertical feed section 409 is provided in the exit side of the paper feed trays 401 and 402 respectively, while a left vertical feed section 410 is provided in the exit side of the paper feed trays 403 and 404 respectively. Also a horizontal feed section 411 is provided at an exit of the right vertical feed section 409, and these feed paths are communicated to the resist roller 314. Also each of the paper feed trays 401 to 404 has paper feed units 412 to 415 each separating and feeding recording paper one by one, and each of the paper feed units 412 to 415 comprising such components as a pick-up roller, a feed roller, and a separate roller. Also designated at the reference numeral 416 is a feed belt which guides recording paper subjected to the transfer and separation processing to the fixing/paper discharge system 104.

Next description is made for operations. The photosensitive drum 301 is rotatably supported by a drum shaft (not shown herein) and rotates counterclockwise according to, for instance, a copy start instruction. Also almost simultaneously to the above operation, a draft as an object for copying carried by the ADF 201 to a specified position on the contact glass 203 is exposed to and scanned by the first scanner 206. Then a reflection light from the draft (a reflection light image) obtained by means of illumination by the fluorescent lamp 204 is formed on the photosensitive drum 301 as an image via the first mirror 205, second mirror 207, third mirror 208, lens 214, fourth mirror 210, fifth mirror 211, and sixth mirror 213. Prior to the operations described above, the surface of the photosensitive drum 301 is homogeneously electrified by the electrifying charger 302, so that an electrostatic latent image according to distribution of electric potential corresponding to the reflection light image is formed, and furthermore light is injected by the eraser 310 onto unnecessary sections of the surface of the photosensitive drum 301, thus an electrostatic latent image area suited to the recording paper or the injected image being obtained. It should be noted that the photosensitive drum 301 must rotates at the same speed as that of the first scanner 206 to obtain an image having the same size as the draft image. Then the electrostatic latent image on the photosensitive drum 301 is converted to a visible image (toner image) with toner stored in the development unit 303. Also the density of the image is adjusted by controlling a quantity of toner deposited on the photosensitive drum 301 by means of loading a development bias voltage to a development bias line of the development unit 303.

In addition, almost simultaneously to the above image forming processing, paper feeding is started. Namely paper feed from any of the paper feed trays 401 to 404, manual paper feed table 405, LCT 105, and double-sided tray 408 is selected, and paper feed is stared at a specified paper feed timing. For instance, if paper is fed from the paper feed tray 401, the paper is fed by paper feed operation of the paper feed unit 412, and the recording paper thus fed is fed via the right vertical feed section 409 and the horizontal feed section 411 into the resist roller 314. The recording paper contacts a nip section of the resist roller 314 which is not driven and is subjected to slanted feed correction (skew correction), and then is fed when the resist roller 314 is restarted at a timing when the recording paper is aligned to a position of a toner image formed on the photosensitive drum 301.

Then the recording paper is fed and closely adhered onto the photosensitive drum 301, and a toner image on the photosensitive drum 301 is transferred onto the recording paper by operations of the PTC 312, PTL 313, and transfer charger 304. In this step, a surface of the photosensitive drum 301 is very smooth, so that the tendency of the recording paper to closely adhere to the surface of the photosensitive drum 301 is very high. For this reason, the tendency of the recording paper to closely adhere to a surface of the photosensitive drum 301 is lowered by lowering an electric potential in the recording paper by means of corona discharge of the separating charger 305. Then the recording paper is separated by the separation claw 316 from the surface of the photosensitive drum 301, and the separated recording paper is transferred by the feed belt 416 to the fixing/paper discharge system 104. In the fixing/paper discharge system 104, heat and pressure are loaded by the fixing roller and the pressurizing roller to the recording paper to fix the toner image on the recording paper, and then the recording paper is discharged to outside of the machine, or onto the double-sided tray 408 when double-sided copy is to be carried out.

On the surface of the photosensitive drum 301 after subjected to the transfer processing are deposited such materials as residual toner after transfer and paper powder. For this reason, the materials deposited on the surface of the photosensitive drum 301 are recovered by the cleaning unit 306 by means of rotating the fur brush 307 or contacting the cleaning blade 308 to the surface of the photosensitive drum 301. Then the quenching clamp 309 is turned ON to homogenize an electric potential on the surface of the photosensitive drum 301 and enters the stand-by state in preparation for the next cycle of copying operation.

It should be noted that the timing in the image forming processing as well as in the paper feed operation described above is obtained according to a pulse signal generated mainly in synchronism to rotation of the photosensitive drum 301, or according to a reference pulse for driving the photosensitive drum 301.

Figure 5:
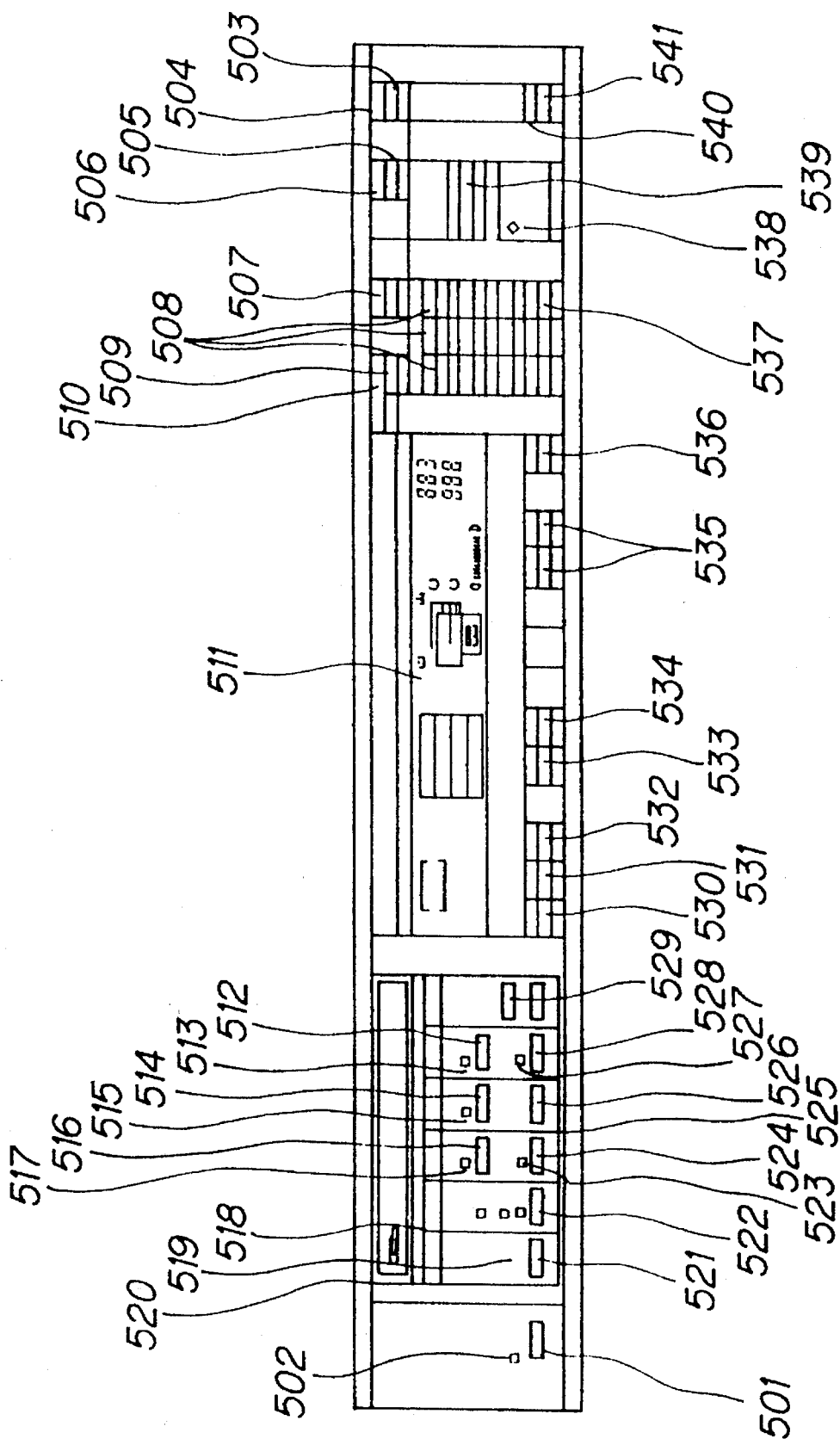
FIG. 5 is an explanatory view illustrating a structure of a panel surface in an operation display section according to the present invention.

FIG. 5 is an explanatory view illustrating a structure of a panel surface of the operational display section according to the present invention, and the panel surface comprises, as shown in FIG. 36 and FIG. 37, a display panel section comprising various types of switch groups, LEDs, and LCDs. In the structure of this operational display section are provided, in addition to functions packaged in a general multi-functional copying machine, a remove message key 501 used by a user to send a message when requesting a maintenance service by a service man (for replacement of parts, adjustment, and cleaning) and a remote message display section 502 which display ON state of the remote message key 501.

It should be noted that, although the remote message key 501 is provided as a dedicated key in the present invention, such an operation as pressing down other key, a function enabled while a function is pressed down, or a combination of keys to be pressed down may be utilized as a function equivalent to that of the remote message key 501 without providing the remote message key 501 itself. Other keys and other displays are shown and described in FIG. 36 and FIG. 37, so that detailed description thereof is omitted herein. In a case where a plurality of displays are assigned to one key, each display is given in rotation in association with the operation of pressing down the key, so that the displays are not compatible as operating modes. Also the guidance display section is constructed so that messages for operation and warning will be given.

Figure 6:
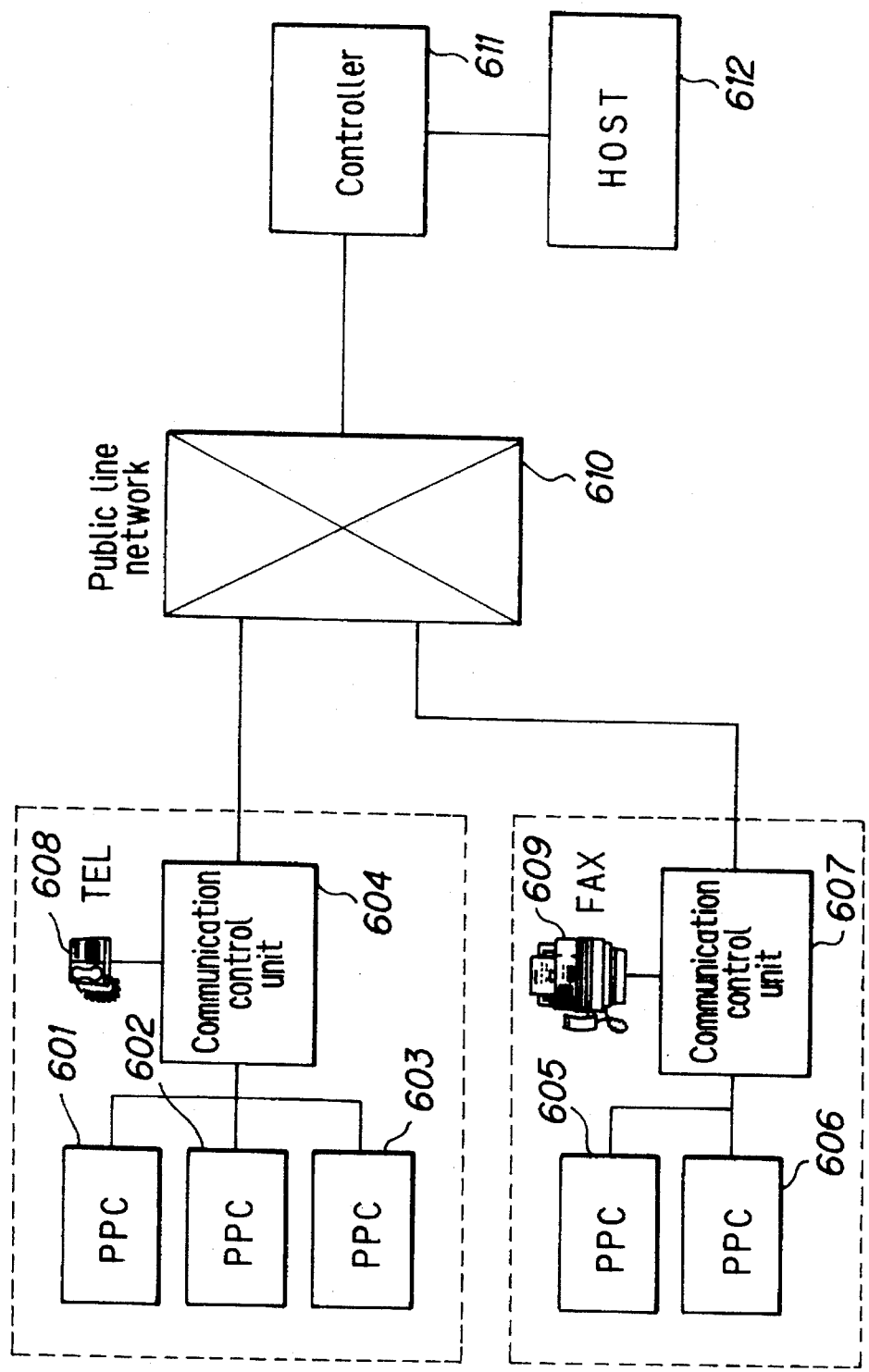
FIG. 6 is a block diagram illustrating schematic structure of an image forming apparatus control system according to the present invention.

FIG. 6 is a block diagram illustrating a schematic structure of an image forming apparatus control system according to the present invention. In this embodiment are provided a group of communication control units 604 to which PPCs (copying machines) 601 to 603 are connected respectively and a group of communication control units 607 to which PPCs 605 and 606 are connected respectively, and furthermore a telephone 608 is connected to the communication control unit 604. On the other hand, to the communication control unit 607 is connected a facsimile machine 609, which can be installed by a user by means of inserting the machine into the user's existing line. Also the communication control units 604 and 607 are connected to the public line network 610, and furthermore the public line network 610 is connected to a controller 611 installed at a service site. Controller 611 may also be referred to herein as a data controller. Also to the controller 611 is connected a HOST 612 for providing centralized control over these system components so that the controller 611 can be installed at each service site.

It should be noted that the HOST 612 is a host computer which provides centralized control over a plurality of controllers 611, and the structure thereof is the same as that of a mainframe computer generally used so that various daily routines other than the data processing for this system can be executed.

Also a plurality of copying machines can be connected to the communication control units 604 and 607, also, only a single copying machine may be connected thereto. Also the copying machines connected thereto may not always be of the same type, and different types of copying machines may be connected to the communication control units 604 and 607. Furthermore equipment other than a copying machine (such as, for instance, a laser printer) can be connected to the communication control units. It should be noted for convenience of description that up to 3 units of copying machine can be connected to the communication control unit 604 and 2 units to the communication control unit 607, or 5 units in all to the two communication control units. Also connection between the communication control units 604 and 607 and a plurality of copying machines 601 through 603, 605, and 606 is a multi-drop connection based on the RS-485 interface standard.

It should be noted that, although only one unit of controller 611 is shown as a control terminal in FIG. 6 above, in practice repair of machines (maintenance) is carried out in as service center and control over a number of sheets of used copy paper is provided from a remote site.

In the above configuration, control over communication between the communication control units 604 and 607 and the plurality of copying machines 601 through 603, 605, and 606 is executed according to the basic type of data transfer control sequence (basic sequence). Namely communication with any of the copying machines 601 through 603, 605, 606 as a slave station is executed by establishing data link (phase 2) by means of the polling/selecting system for centralized control (enabling data transfer only between a control station and slave stations) with the communication control units 604 and 607 as control stations. A specific value can be set to each of the copying machines 601 through 603, 605, and 606 with an address set switch 907 (Refer to FIG. 9), and a polling address as well as a selecting address for each of the copying machines 601 through 603, 605, and 606 are decided with this operation.

Figure 7:
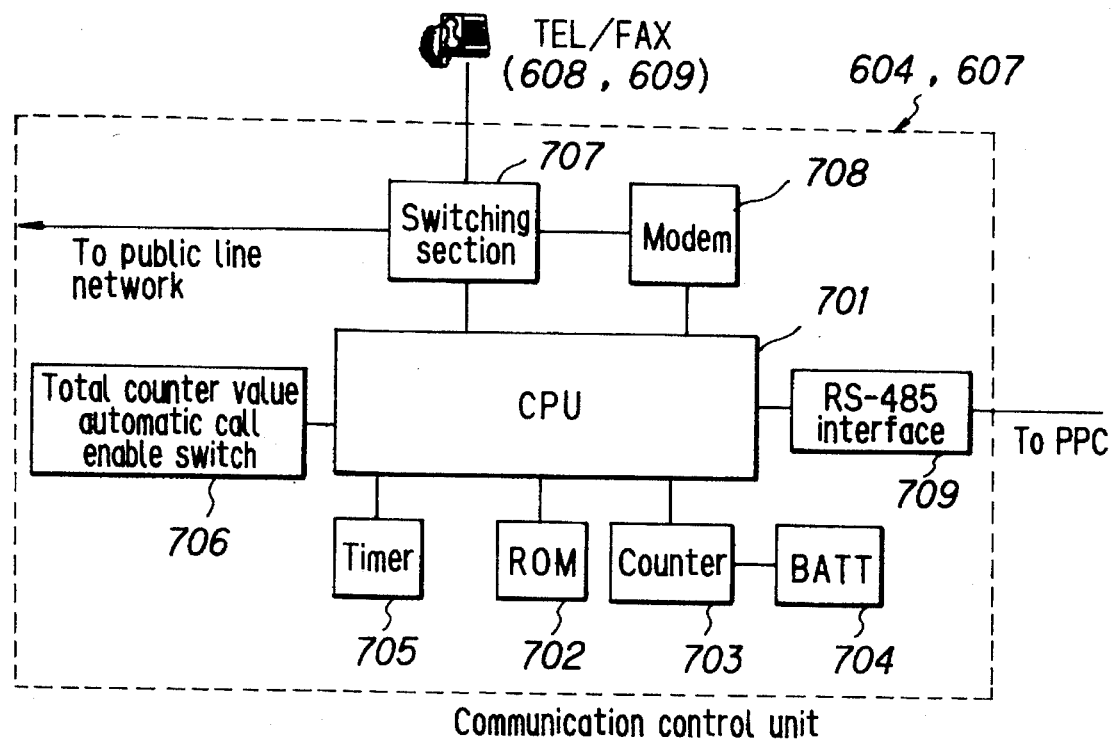
FIG. 7 is a block diagram illustrating structure of a communication control unit according to the present invention.

FIG. 7 is a block diagram illustrating a structure of the communication control units 604 and 607 according to the present invention. In this figure, designated at the reference numeral 701 is a CPU which provides communication control based on control program data, at 702 a ROM in which control program data is stored, at 703 a RAM in which results of computing by the CPU 701 or those of intermediate processing are stored and also which has a function as a counter, at 704 a BATT (battery) which supplies power to the RAM 703, at 705 a timer which provides a reference time for processing in this apparatus, at 706 a total counter value automatic call enable switch, at 707 a switching section which switches the public line network to the telephone 608 or the facsimile machine 609, at 708 a modem (modulating/demodulating device), and at 709 an RS-485 interface.

Next description is made hereinafter for operations of the communication control units 604 and 607 each having the structure as described above. A signal from the public line network is at first inputted into the switching section 707. Herein, if the signal is, for instance, for the telephone 608 (or a facsimile machine 609) connected to the communication control unit 604, the public line network is switched to the telephone 608 (or the facsimile machine 609), and if the signal is from the controller 611, the public line network is connected to the modem 708. Also communication with the copying machine side is executed with a communication interface using a transceiver for the RS-485. It should be noted that these operations for control processing are executed mainly by the CPU 701 according to a control program previously stored in the ROM 702. Also in the RAM 703 is stored such data as a result of intermediate processing by the CPU 701, and the RAM 703 is used to temporally store a text for communication.

Also various types of parameter required for operations of the communication control units 604 and 607 sent from the controller 611 are stored in the RAM 703. Furthermore the communication control units 604 and 607 are usually kept energized for 24 hours a day so that communication between the communication control units 604 and 607 and the controller 611 is always possible, but in addition a back-up power is supplied from the BATT 704 so that contents of the parameters will not be lost even if any unexpected failure such as power failure should occur.

Figure 8:
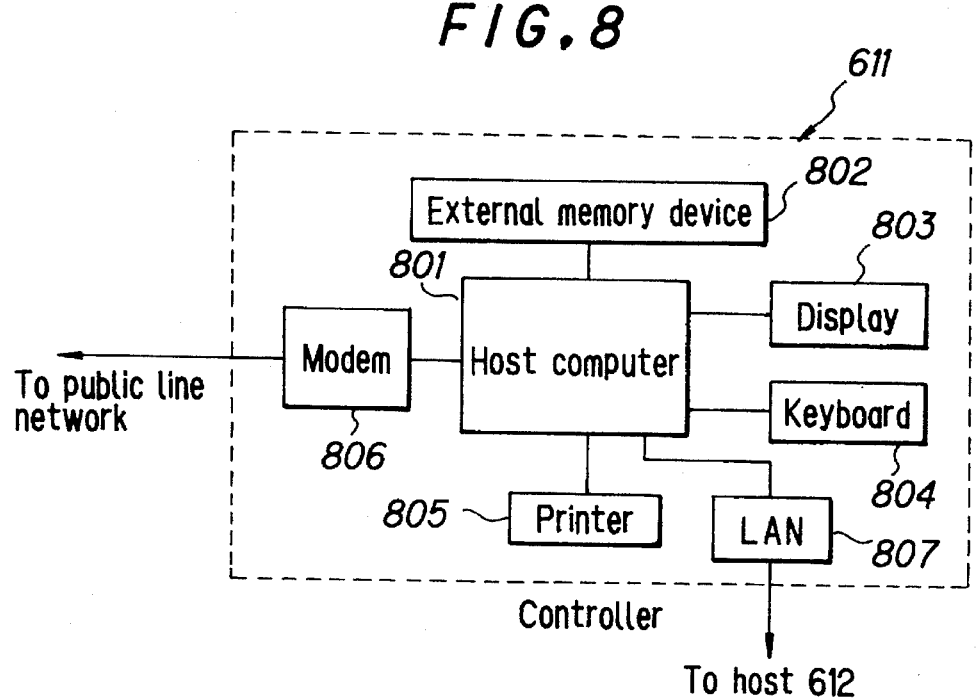
FIG. 8 is a block diagram illustrating a structure of a controller according to the present invention.

FIG. 8 is a block diagram illustrating a structure of the controller 611 according to the present invention. This controller 611 comprises a host computer 801 which executes various types of processing, an external memory device 802 such as a magnetic disk to store control data or others therein, a display 803 for display, a keyboard 804 as an operation input means, a printer 805 for recording data, a modem 806 for connection to the public line network, and a LAN (local area network) 807, all of these system components connected to each other.

Figure 9:
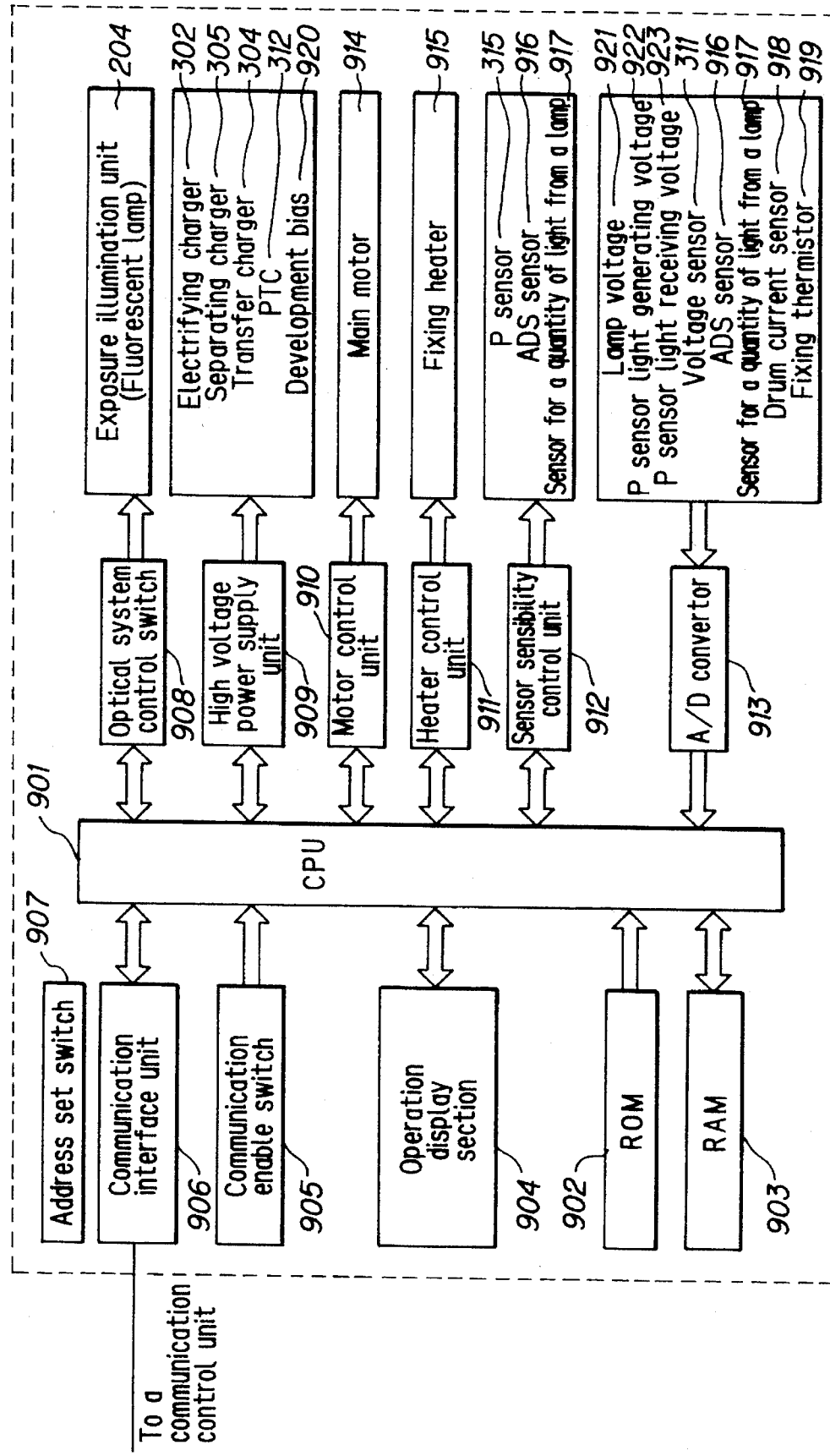
FIG. 9 is a block diagram illustrating a structure of a copying machine according to the present invention.

FIG. 9 is a block diagram illustrating a structure of a copying machine according to the present invention. In this figure, designated at the reference numeral 901 is a CPU which executes control according to a control program or data, at 902 a ROM in which a control program is stored previously, at 903 a RAM in which such data as results of processing by the CPU 901 is stored, at 904 an operation display section (Refer to FIG. 5), at 905 a communication enable switch, at 906 a communication interface unit connected to the communication control units 604 and 607 in one side thereof, and at 907 an address setting switch connected to the communication interface units 906.

Also to the CPU 901 are connected an optical system control unit 908, a high voltage unit 909, a motor control unit 910, a heater control unit 911, a sensor sensitivity control unit 912, and an A/D convertor 913 respectively.

To the optical system control unit 908 is connected the exposure illumination unit (fluorescent lamp) 204, and to the high voltage unit 909 are connected the electrifying charger 302, separating charger 305, transfer charger 304, PTC 312, and development bias 920 respectively. Also to the motor control unit 910 is connected a main motor 914, to the heater control unit 911 a fixing heater 915, to the sensor sensitivity control unit 912 the P-sensor 315, an ADS sensor 916 and a sensor 917 for a quantity of light from a lamp respectively. Also to the A/D convertor 913 are connected a lamp voltage 921, a P-sensor light emitting voltage 922, a P-sensor light receiving voltage 923, the electric potential sensor 311, the ADS sensor 916, the sensor 917 for a quantity of light from a lamp, a drum current sensor 918, and a fixing thermistor 919 so that an I/O value from each of the above system components will be inputted.

Next description is made for operations. Control of the basic system of a copying machine itself is executed mainly by the CPU 901 according to a control program or other data stored in the ROM 902. Also intermediate results of processing by the CPU 901 are stored in the RAM 903. The A/D convertor 913 converts analog data including the lamp voltage 921, P-sensor light emitting voltage 922, P-sensor light receiving voltage 923, output from the electric potential sensor 311, output from the ADS sensor 916, output from the sensor 917 for a quantity if light from a lamp, output from the drum current sensor 918, and voltage in the fixing thermistor 919 to digital data and outputs the converted data to the CPU 901.

The high voltage supply unit 909 supplies a high voltage power to the electrifying charger 302, separating charger 305, transfer charger 304, PTC (pre-transfer charger) 312, and development bias 920, while the motor control unit 910 drives and controls the main motor 914. Also the sensor sensitivity control unit 912 is used to change and control a light receiving gain of the sensor 917 for a quantity of light from a lamp, a light receiving gain of the ADS sensor 916, a light receiving gain in the P-sensor 315, and a light emitting voltage of the P-sensor 315. Also the optical system control unit 908 controls the exposure illumination unit 204, while the heat control unit 911 controls the fixing heater 915.

The communication interface unit 906 is a unit executing communication with the communication control units 604 and 607, and an address specific to each copying machine can be specified with the address setting switch 907 in a range from 1 to 5. Also communication with the communication control units 604 and 607 can be enabled or inhibited by the communication enable switch 905.

Figure 10A:
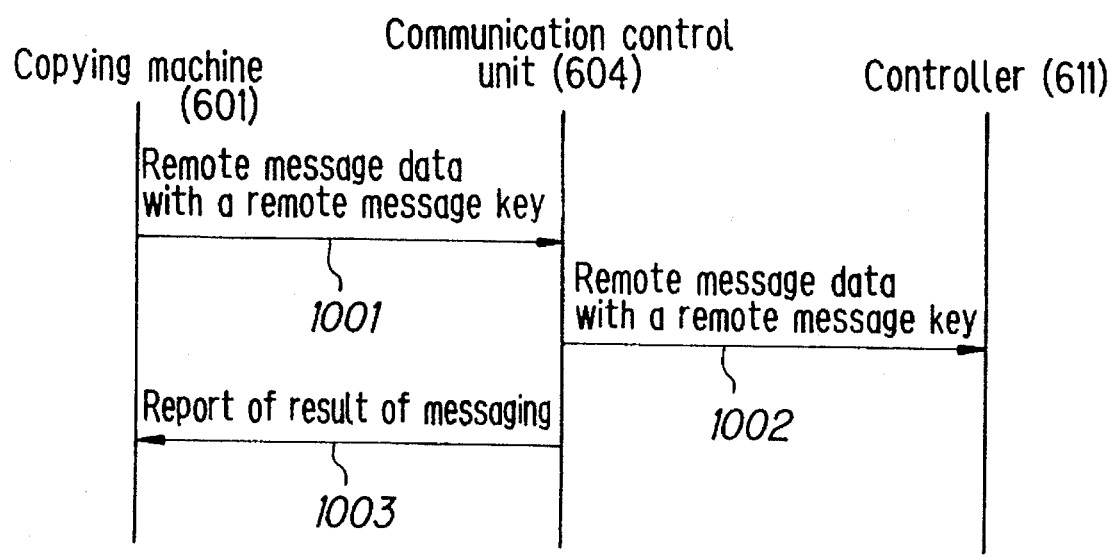
FIG. 10A is an explanatory view illustrating a remote message function according to the present invention.
Figure 10B:
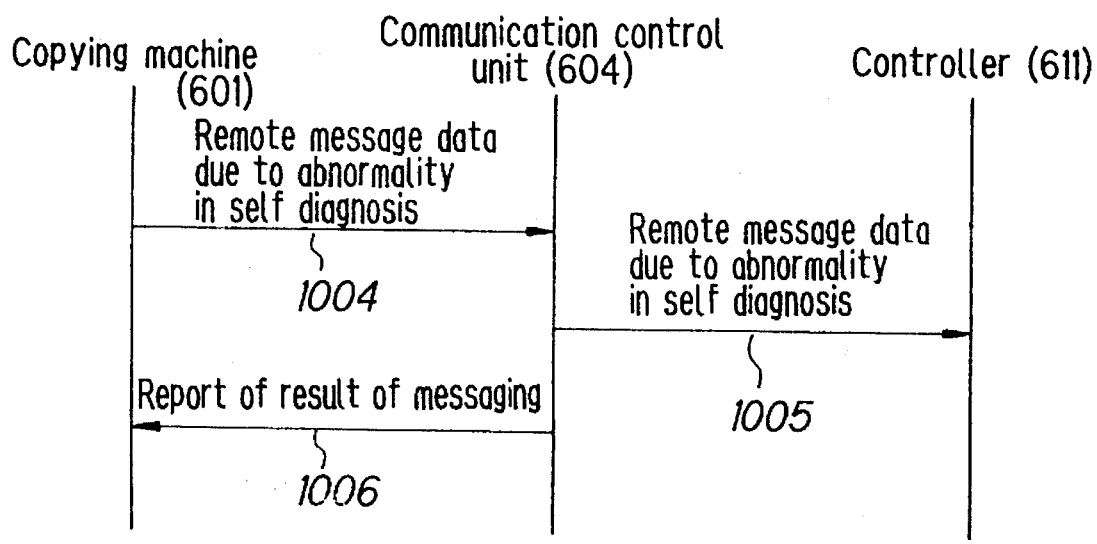
FIG. 10B is an explanatory view illustrating a remote message function according to the present invention.
Figure 10C:
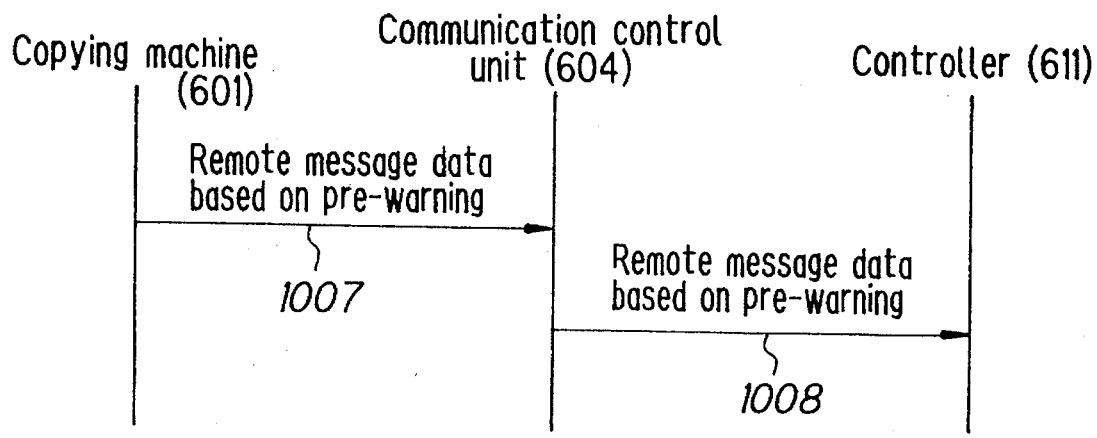
FIG. 10C is an explanatory view illustrating a remote message function according to the present invention.

FIGS. 10A through 10C present an explanatory view illustrating functions for remote message according to the present invention, and FIG. 10A, FIG. 10B, and FIG. 10C show a remote message with the remote message key 501, that due to abnormality in self diagnosis, and that due to pre-warning respectively.

In FIG. 10A, if, for instance, the remote message key 501 of the copying machine 601 is pressed down, data for remote message 1001 is returned from the copying machine 601 to the communication control unit 604. The communication control unit 604 having received the data calls a telephone number of the controller 611 previously set up in the communication control unit 604 and sends remote message data 1002. The controller 611 generally is installed at such a site as a service base, and of the plurality types of the data the communication control unit 604 received from a copying machine, the communication control unit 604 sends only the types of data previously set in the communication control unit 604 to the controller 611. Also the above operation is executed similarly to the communication control unit 607.

It should be noted that the above setting can be executed from the controller 611 through the public line network 610 to the communication control units 604 and 607. For instance, when the communication control units finishes transmitting specified data to the controller 611, the communication control unit 604 sends a message result report 1003 indicating a result of communication between the communication control unit 604 and the controller 611 to the copying machine 601 which sent the remote message data 1001. With this operation, the copying machine 601 can make a determination as to whether the communication has been normally executed and finished or has not been executed due to some abnormality or for some other reason.

Next description is made for remote message due to abnormality found during self diagnosis shown in FIG. 10B. Generally a copying machine (herein the copying machine 601 is assumed for convenience of description) has a self diagnosis function, and provides such as message as "Error" and "Service man call" in the operation display section 904 to alert a user or a service man when the copying machine 601 is in a risky state or has been disabled in such cases as when abnormality in fixing temperature is detected by the fixing thermistor 919 or when adjustment of each section to be adjusted by adjusting a electronic volume has been disabled. Even in the case as described above where some abnormality has been detected by the self diagnosis function of the copying machine 601, remote message data 1004 due to abnormality during self diagnosis is sent from the copying machine 601 to the communication control unit 604. The communication control unit 604 having received the remote message data returns the remote message data 1005 to the controller 611 likely in a case where the remote message key 501 is pressed down, and, when the communication is over, sends a message result report 1006 to the copying machine 601 which sent the remote message data 1001.

Next description is made for a remote message due to pre-warning shown in FIG. 10C. In this step, if a copying machine (herein the copying machine 601 is assumed for convenience of description) made a determination that maintenance (PM) should be executed in a case where the self diagnosis function thereof detected a state which is not abnormal but is very close to an abnormal state, the copying machine sends a remote message data 1007 as a pre-warning to the communication control unit 604 similarly. In case of remote message due to abnormality during self diagnosis, the copying machine 601 is kept enabled, and even during communication a text is set, and a prespecified operation for copying is executed when the start key 538 (Refer to FIG. 5) is pressed down. Then, if work load to control system in the copying machine 601 is too large because of the operation for copying, or if contents of transmitted data is changed due to a copying operation and the consistency is lost, communication can be interrupted.

Also as a degree of urgency of remote message data 1008 as a pre-warning is rather low, the communication control unit 604 having received the remote message data 1008 does not sent it to the controller 611 immediately, and executes transmission of the data selecting a time zone suited to the communication such as a time zone when a frequency of use the telephone 608 or the facsimile machine 609 connected to the communication control unit 604 is low, or when traffic in the public line network is low. The time for delayed transmitted can be set from the controller 611 to the communication control unit 604. Also a remote message as a pre-warning is different from other types of remote message, and a result of message result is not sent to the copying machine 601.

Figure 11A:
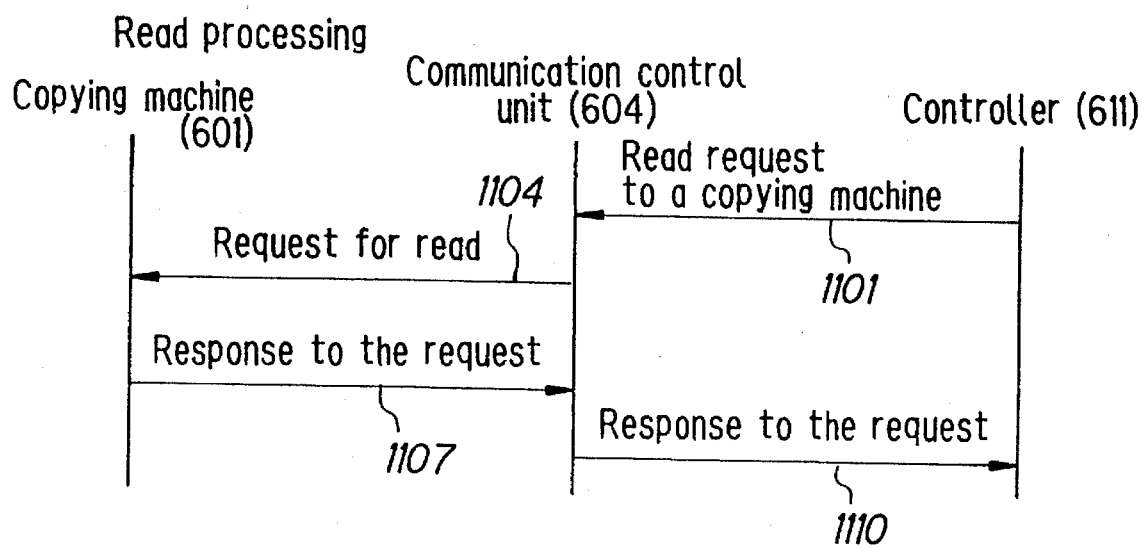
FIG. 11A is an explanatory view illustrating an operation for accessing a copying machine from a controller according to the present invention.
Figure 11B:
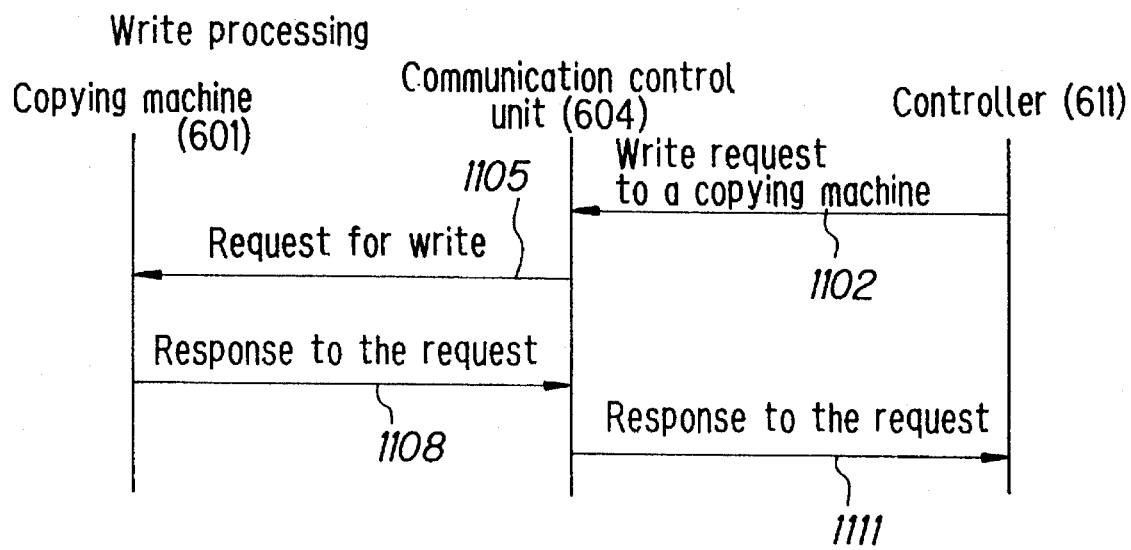
FIG. 11B is an explanatory view illustrating an operation for accessing a copying machine from a controller according to the present invention.
Figure 11C:
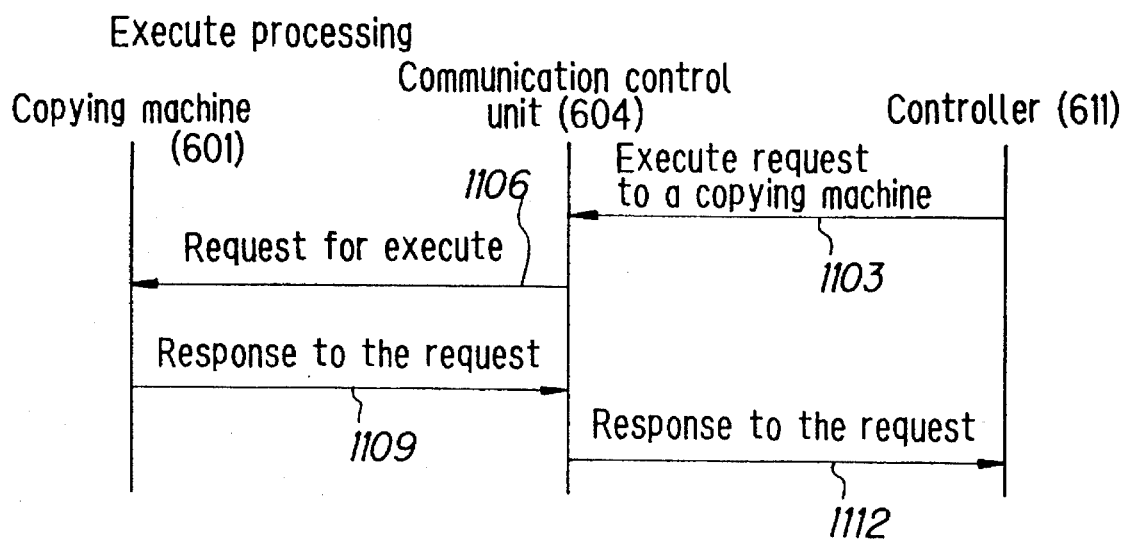
FIG. 11C is an explanatory view illustrating an operation for accessing a copying machine from a controller according to the present invention.

FIGS. 11A through 11C present an explanatory view illustrating operation for access from a controller to a copying machine according to the present invention. The operation for access is largely classified according to the purpose to the read processing shown in FIG. 11A, write processing shown in FIG. 11B, and execute processing shown in FIG. 11C, and the read processing is a process to read logging data in a copying machine, various types of set-up value, and output values from various types of sensor. The write operation is a process to send various types of set-up values from the controller 611 to rewriting data. The execute processing is a process to make a copying machine executed such operations as a test operation.

In any of the processing described above, call by dialing is executed from the controller 611 to the communication control unit 604 to which a target copying machine (for instance, the copying machine 601) is connected, and the communication control unit 604 receives these request data 1101 to 1103 from the controller 611. The communication control unit 604 having received the request data transmits request data 1104 to 1106 to a target copying machine 601. The copying machine 601 having received the request data 1104 to 1106 processes contents of the request and returns responses 1107 to 1109 to the request to the communication control unit 604. Furthermore the communication control unit 604 sends responses 1110 to 1112 to the controller 611, thus a processing unit being completed.

Figure 12A:
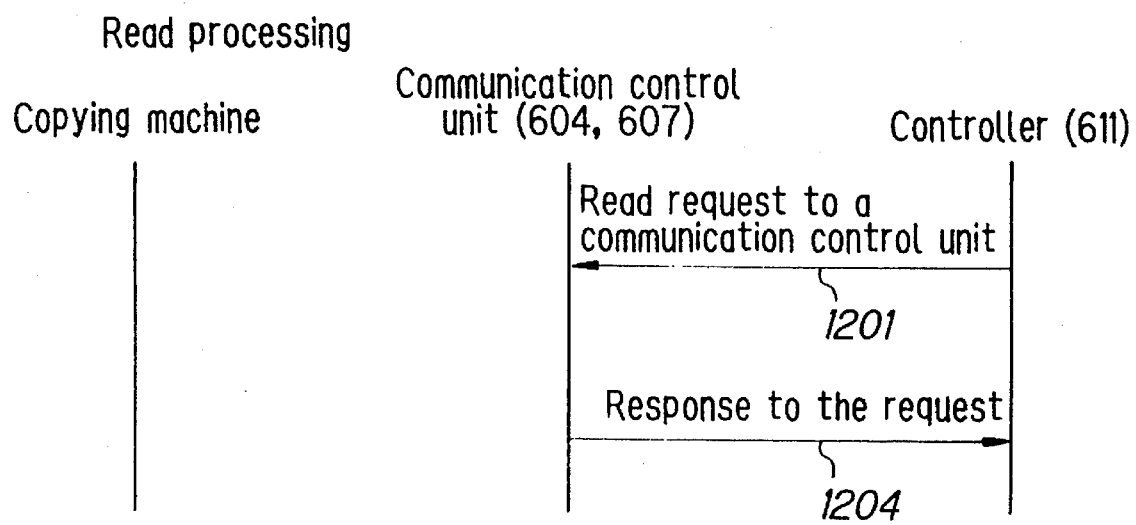
FIG. 12A is an explanatory view illustrating an operation for accessing a communication control unit from the controller according to the present invention.
Figure 12B:
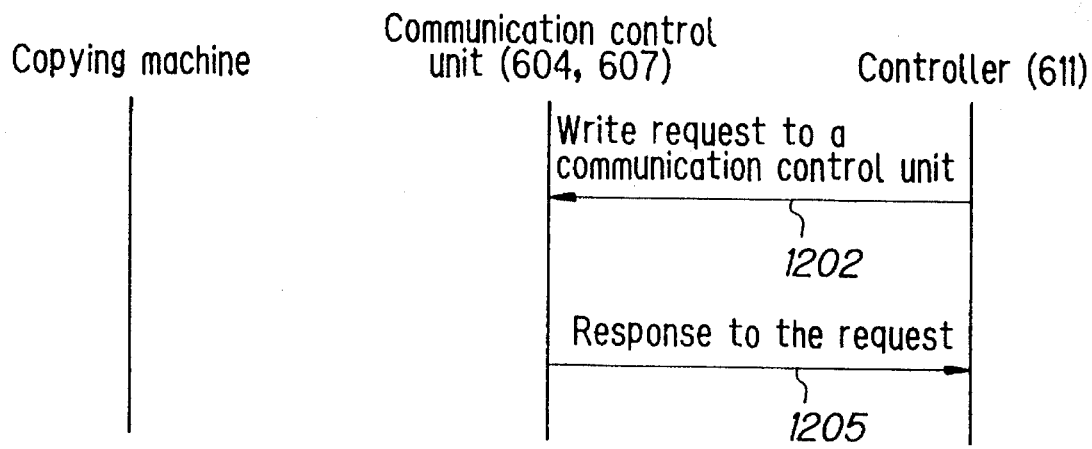
FIG. 12B is an explanatory view illustrating an operation for accessing a communication control unit from the controller according to the present invention.
Figure 12C:
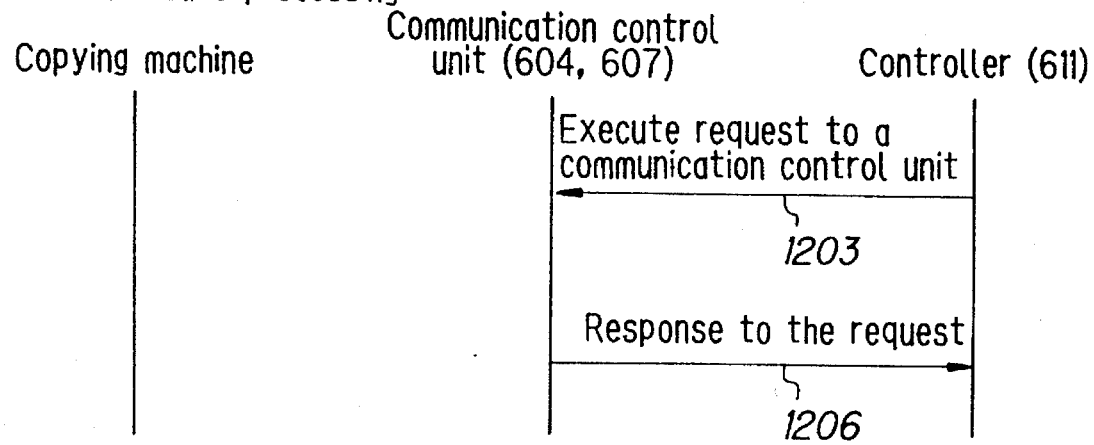
FIG. 12C is an explanatory view illustrating an operation for accessing a communication control unit from the controller according to the present invention.

FIGS. 12A through 12C present an explanatory view illustrating operation for access from a controller to a communication control unit according to the present invention. Access from the controller 611 to the communication control units 604 and 607 are largely classified according to the purpose of operation to three types of processing; the read processing as shown in FIG. 12A, the write processing as shown in FIG. 12B, and the execute processing as shown in FIG. 12C.

The read processing as shown in FIG. 12A includes a process to read parameters set up in the communication control units 604 and 607 and status thereof, and a process to read, when the communication control units 604 and 607 read data in the copying machines 601 through 603, 605, 606 and have stored the data therein, the data.

The write processing as shown in FIG. 12B includes a process to transmit parameters for the communication control units 604 and 607 from the controller 611 for setting. The execute processing as shown in FIG. 12C includes a process to make the communication control units 604 and 607 execute test operations such as checking functions. Namely in the above types of processing, a request for any of the requests 1201 to 1203 for the read processing, write processing and execute processing is sent from the controller 611 to the communication control units 604 and 607, and the communication control units 604 and 607 send responses 1204 to 1206 to the controller 611 in reply to the request.

Figure 13:
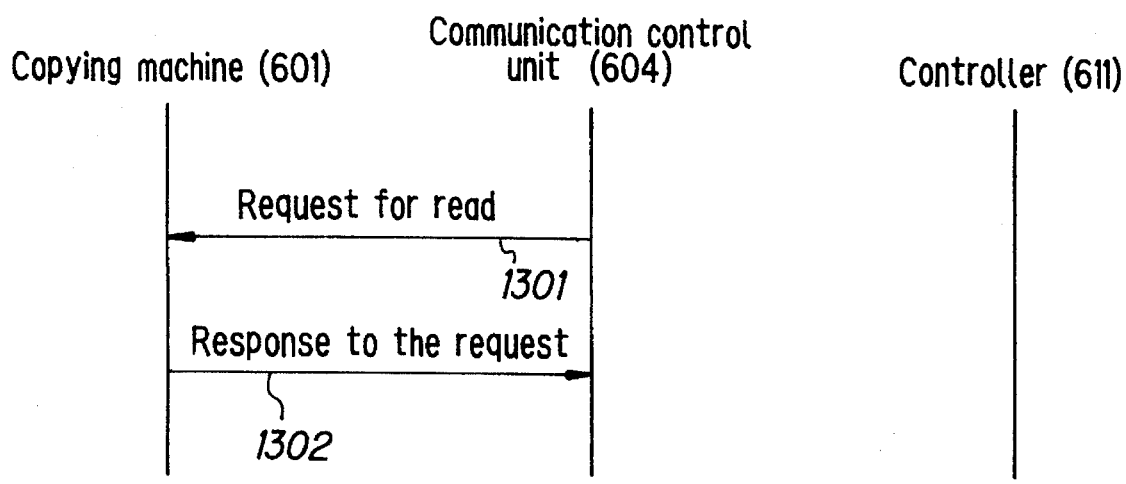
FIG. 13 is an explanatory view illustrating an operation for accessing a copying machine from the communication control unit according to the present invention.

FIG. 13 is an explanatory view illustrating an operation for access from a communication control unit to a copying machine according to the present invention, and this figure assumes a case of access from the communication control units 604 and 607 to the copying machines 601 through 603, 605, and 606 without using the controller 611. For instance, access 1301 from the communication control unit 604 to the copying machine 601 is the read processing in which the communication control unit 604 reads data in the copying machine 601 (Read processing 1032) and stores the data in the communication control unit 604 so that the data can be read from the controller 611 later.

By the way, a maintenance contract for a copying machine or maintenance is executed according a count indicating, for instance, a total number of sheets of used copy paper. In this remote diagnosis apparatus according to the present invention, a count value indicating a total number of sheets of used copy paper is periodically sent from the copying machines 601 through 603, 605, 606 to the communication control units 604 and 607, and even if communication with the copying machines 601 through 603, 605, 606 has been disabled due to such as reason as that the power for the copying machines 601 through 603, 605, 606 is OFF, the controller 611 can know this count value.

Concretely, as described above the function of communication control units 604 and 607 to read data in the copying machines 601 through 603, 605, 606 and store the data therein is utilized. For this reason, at a point of time when a time for collecting a total count, one of parameters set in the communication control units 604 and 607, comes in accordance with the timer 705 in the communication control units 604 and 607, the communication control units 604 and 607 send a request for a total number of sheets of used copy paper to all the copying machines 601 through 603, 605, and 606 connected thereto every day.

New data indicating a total number of sheets of used copy paper for any of the copying machines 601 through 603, 605, 606 that returned a response including data concerning year, month, day, and time of a day are read out on the previous day and are stored in the communication control units 604 and 607. Also if communication with a copying machine (for instance, the copying machine 601) to which a request for a total number of sheets of used copy paper is impossible because, for instance, power for the copying machine has been disconnected, the operation for receiving data returned from the copying machine 601 is postponed, and processing for the next copying machine 602 is executed.

In such a case as described above, at a point of time when a request to all the copying machines 601 through 603, 605, 606 has been executed, a request to only the copying machine 601 not having been able to receive the request is executed. Generally, the time for collecting the total counter value is set during light time when it is generally considered that the power to the copying machines 601 through 603, 605, 606 is OFF, and power to the copying machines 601 through 603, 605, 606 is turned ON when the set-up time comes, and the copying machines 601 through 603, 605, 606 executes the above communication while idling or adjustment of each section being executed immediately after the power is turned ON.

There are two ways of transferring data concerning a total number of sheets of used copy paper stored and retained in the communication control units 604 and 607 to the controller 611, one is a method in which the data is read by periodically accessing to the data on such a day as a day for clearance every month from the controller 611, and the other is a method in which, when a date for automatically calling a total counter value set up in the communication control units 604 and 607 comes, the communication control units 604 and 607 automatically send the data to the controller 611.

Selection of any of the above two methods is executed with the total counter value automatic call enable switch 706 provided in the communication control units 604 and 607. Namely, if the total counter value automatic call enable switch 706 is ON, when the day and time set up previously in the communication control units 604 and 607 come, a call is transmitted to a telephone number to which a message is to be sent indicated by the parameter set up in the communication control units 604 and 607, and a counter value indicating a total number of sheets of used copy paper is sent to the controller 611. Also when the total counter value automatic call enable switch 706 is OFF, automatic call is not executed, and access from the controller 611 is waited. It should be noted that, although data to which communication is periodically executed is used as a counter value, other data may be used or addition of other data is allowable.

Also the communication control units 604 and 607 can control a plurality of copying machines 601 through 603, 605, 607 to fetch data serially from the copying machines, but it is rare that the maximum number of copying machines enough to fill up the capacity for accommodation are connected, and for this reason in this system time required for access is reduced as much as possible so that a data request will not be issued to copying machines not connected thereto.

FIG. 38 is a list of parameters to be set in the communication control unit according to the present invention, and in this list contents of each parameter corresponds to a data length thereof. A machine type number (product number) and a serial number (manufacture control number) are registered for each of the copying machines 601 through 603, 605, 606 specified by the addresses 1 to 5 respectively, and these data is added in sending a message to the controller 611, or is used to decide an address of each of the copying machines 601 through 603, 605, 606 to be selected in access from the controller 611.

A telephone number of a target to which an message is to be sent, times of and a time interval between redialing, a type of data to be sent to the controller 611 are set previously to each remote message reason. Also for a remote message as a pre-warning, also timing for sending the message to the controller 611 is set. Check sum is added to each block of a parameter, and the check sum can be detected when a malfunction occurs in the communication control units 604 and 607 occurs, or when a parameter value is rewritten or deleted due to such a reason as life out of a battery (BATT 704) for backing up the RAM 703. These parameters are written via the public line from the controller 611, but many be written from a portable device for setting parameters directly connected to the communication control units 604 and 607, or from an operating means provided on the communication control units 604 and 607.

Parameter setting in the above step is an important function, and the capability for security is made higher by adding ID to the data for communication. This ID is not set specifically to each of the communication control units 604 and 607, but is set when a first parameter is specified. After this ID is set once, the communication control units 604 and 607 can be initialized manually. This ID is checked each time communication is executed so that intervention by, for instance, a hacker is prevented.

FIGS. 14A through 14C present an explanatory view illustrating a data format for remote message according to the present invention. It should be noted that herein description is made for the communication control units 604 and copying machine 601 for convenience of description. FIG. 14A shows a format of data sent from the copying machine 601 to the communication control unit 604, and the header field is message reason code 1401 indicating which of the remote message with the remote message key 501, that due to abnormality in self diagnosis, and that due to pre-warning the current remote message is. Data in the copying machine 601 comes after the code indicating a type of the remote message. Namely times of generated jamming 1402, times of generation of abnormality in self diagnosis 1403, a number of sheets of used copy paper 1404, and status of the copying machine 1405 come after the code. Then the status of copying machine 1405 is data concerning whether toner for development is present or not, quantity of oil for fixing, set condition of a supply such as a recording paper output values from various types of sensor, values set up in various sites for adjustment, and connection of each unit.

FIG. 14B is a format of data from the communication control unit 604 to the controller 611. To this data format are added at its head, in addition to the data sent from the copying machine 601, fields for a machine type number 1406 as well as for a serial number 1407 to identify the copying machine 601 which is a source of the data. Furthermore behind the data in the copying machine 601 are added message reason code 1408, times of generation of abnormality in self diagnosis 1409, and status of the copying machine 1410, and time of generation of cause for the message 1411 is added to the end by the timer 705 in the communication control unit 604. Also a type of data to be transmitted to the controller 611 according to parameters set up in the communication control unit 604 changes, but in this embodiment, parameters for the communication control unit 604 are set so that only the times of generation of abnormality in self diagnosis 1409 and status of a copying machine 1410 are transmitted to the controller 611.

FIG. 14C is an explanatory view illustrating a format of data sent from the communication control unit 604 to the copying machine 601, and shows a message result report sent at a point of time when transmission of a message from the communication control unit 604 to the controller 611 is finished to the copying machine 601. Namely this data format consists of a message result report code 1412 and contents of the message result report 1413.

For this reason, as shown in FIG. 14, to data sent from the copying machines 601 through 603, 605, 606 are added the message reason code 1401. And the communication control units 604 and 607 identify each of the message reason code 1401 and classified it to the following categories;

(1) Data inputted with the remote message key 501

(2) Data due to abnormality in self diagnosis (3) Data due to pre-warning (4) Data for a total counter value When data is classified to any of the above four categories, the data is stored in the communication control units 604 and 607, and a telephone number of a target for remote message within parameters shown in FIG. 38 corresponding to the data type is selected, and the data is sent to the telephone number. Also in FIG. 38, by unifying a telephone number for each data category, a centralized control is realized, and furthermore by individualizing the control, each site can be controlled.

FIGS. 15A through 15C present a data format when accessing from a controller according to the present invention to a copying machine, and in FIG. 15A is shown the data format for read processing, in FIG. 15B that for the write processing, and in FIG. 15C that for execute processing. It should be noted that herein description is made for the communication control units 604 and the copying machine 601 for convenience of description.

In the read processing shown in FIG. 15A, a machine type number 1501 and a serial number 1502 each for the target copying machine 601 followed by request code 1503 indicating the read processing and idiom code 1504 to be execute in the read processing are transmitted from the controller 611 to the communication control unit 604. Also only read request code 1505 and item code 1506 without fields for a machine type number and a serial number are transmitted from the communication control unit 604 to the copying machine 601. The copying machine 601 having received the data above transmits read response code 1507 and received item code 1508 followed by the requested data 1509 to the communication control unit 604. Then the communication control unit 604 transmits the data with a machine type number 1510 and a serial number 1511 added thereto to the controller 611.

In the write processing shown in FIG. 15B, when sending data to the copying machine 601, different from the case of read processing as described above, item code 1512 followed by data to be written 1513 is transmitted. In communication with the controller 611, a field for item code 1514 followed by the data 1515 actually written in the copying machine 601 is transmitted. Generally data to be written 1513 received by the copying machine 601 coincides with written data 1516 to be transmitted by the copying machine 601, but some times a boundary value is rounded in writing the data in such a case as when received data is outside the effective range, and in such cases the former does not coincide with the latter.

In the execute processing shown in FIG. 15C, when communicating with the copying machine 601, if a target for operation can not be identified with only item code 1517, code 1518 to supplement contents of the operation is added behind the item code 1517. The copying machine 601 having executed the requested operation sends operation result data 1519 to the controller 611.

FIGS. 16A through 16C present an explanatory view illustrating a data format in access from a controller to a communication control unit, and like in the above description, in FIG. 16A is shown the read processing, in FIG. 16B the write processing, and in FIG. 16C the execute processing. As shown in the figures, in each type of processing, the upper stage shows access to the communication control units 604 and 607, while the lower stage shows a response from the communication control units 604 and 607, and this data format is the same as that in access to the copying machines 601 through 603, 605, and 606, but a machine type number and a serial number are replaced by code 1601 through 1606 indicating the communication control units 604 to 607 respectively.

FIG. 17 is an explanatory view in access from the communication control unit according to the present invention to a copying machine, and the data format is the same as that between the communication control units 604 and 607 and the copying machines 601 through 603, 605, 606 when accessing from the controller 611 to the copying machines 601 through 603, 605, 606 described in relation to FIG. 15A. For this reason, the copying machines 601 through 603, 605, 606 are not required to differentiate access from the controller 611 from that from the communication control units 604 and 607, and can treat them similarly.

Figure 18:
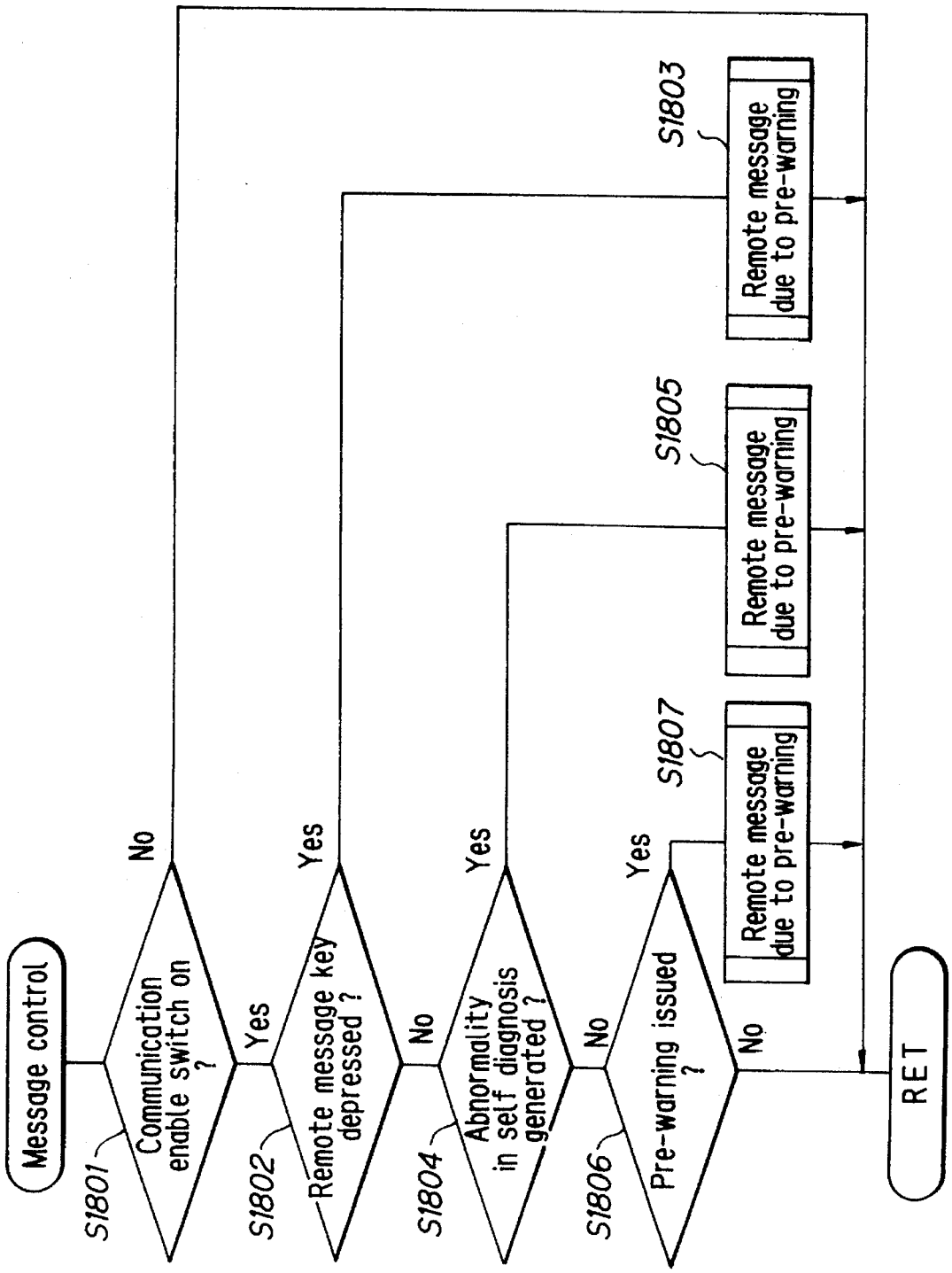
FIG. 18 is a flow chart illustrating operations for communication control in a copying machine according to the present invention.

FIG. 18 is a flow chart illustrating operations for processing messages in a copying machine according to the present invention. In this figure, at first determination as to whether the communication enable switch 905 is ON or not is made (S1801), and when it is determined that the communication enable switch is ON, furthermore a determination as to whether the remote message key 501 has been pressed down (turned ON) or not is executed (S1802). In this step if it is determined that the remove message key 501 is ON, a remote message processing by the remote message key 501 (refer to FIG. 10A and FIG. 19) is executed (S1803).

In the step S1802 above, if it is determined that the remote message key 501 has not been pressed down, furthermore determination as to whether any abnormality in self diagnosis has been generated or not is executed (S1804), and if it is determined that abnormality in self diagnosis has been generated, an operation to process a remote message due to abnormality in self diagnosis (Refer to FIG. 10B and FIG. 20) is executed (S1805). Also in the above step S1804, if it is determined that any abnormality in self diagnosis has not been generated, furthermore a determination as to whether pre-warning has been executed or not (S1806), and if it is determined that pre-warning has been executed, a remote message processing (Refer to FIG. 10C and FIG. 21) is executed (S1807). It should be noted that, if it is determined in the step S1801 above that the communication enable switch 905 has not been turned ON, after all the steps S1803, S1805, and S1807 are executed, and when it is determined in the above step S1806 that pre-warning has not been executed, this routine is returned.

Figure 19:
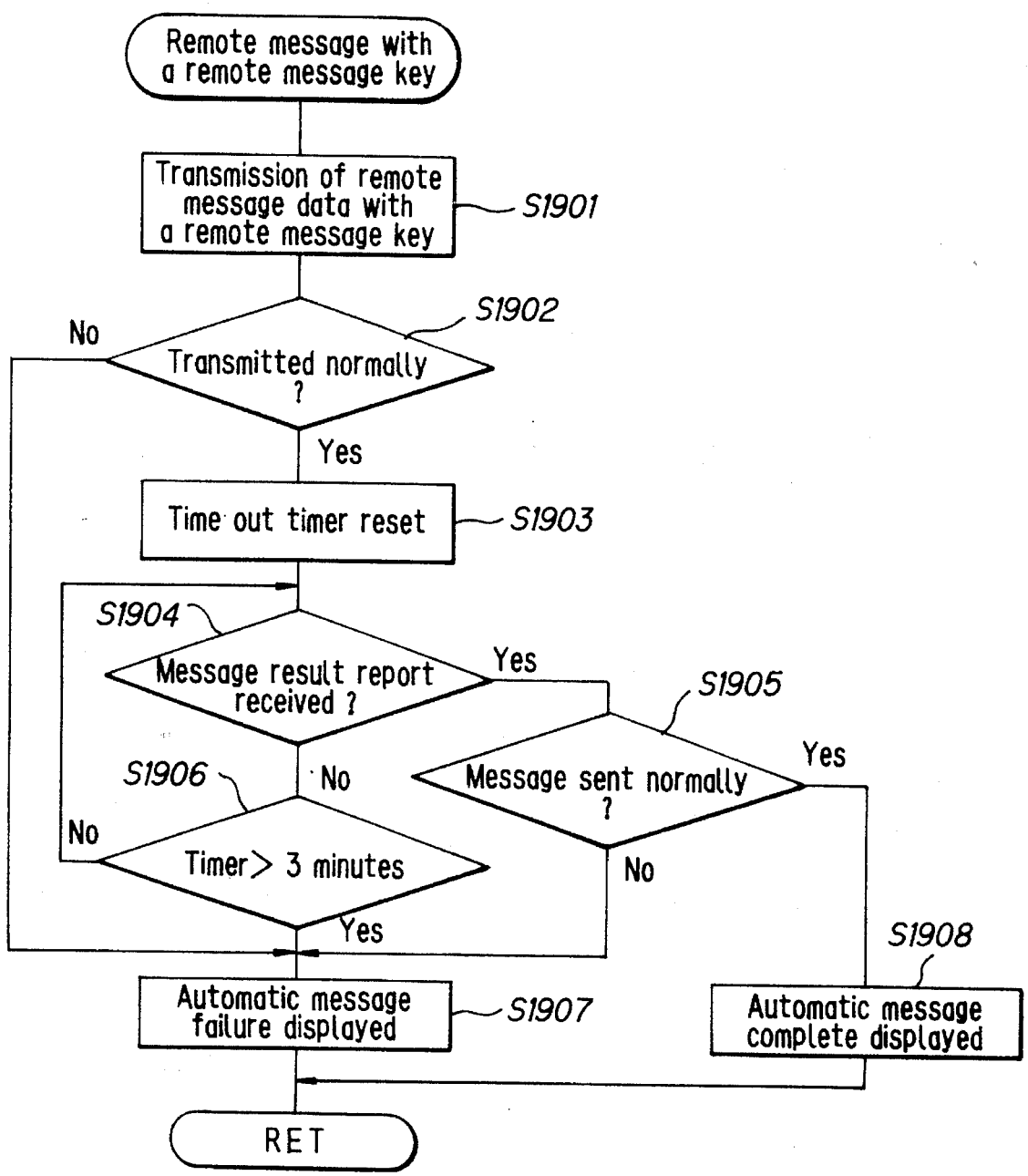
FIG. 19 is a flow chart illustrating operations for remote message processing with a remote message key according to the present invention.

FIG. 19 is a flow chart illustrating a remote message processing with the remote message key 501 according to the present invention. In this figure, at first transmission of remote message data is executed with the remote message key 501 to the communication control units 604 and 607 (S1901), and then a determination as to whether the transmission was executed normally or not is executed (S1902). In this step, if it is determined that the remote message data was transmitted normally to the communication control units 604 or 607, a timer for time out determination is reset (S1903), and furthermore a determination as to whether a message result report form the communication control unit 604 or 607 has been received or not is executed (S1904). Then if it is determined that the message result report was received normally, then a determination as to whether an operation for sending the message was executed normally or not us executed (S1905).

Also in the step above, if it is determined that a message result report from the communication control units 604 or 607 has not been received yet, furthermore determination as to whether the operation for receiving the report was executed within three minutes or not is executed (S1906), and if it is determined that the data was received within three minutes, a message indicating that an automatic massaging failure is provided on the operation display section 904, while if it is determined that the data was not received within 3 minutes, the system control returns to the step S1904. It should be noted that, although the time out time was sent to 3 minutes in this embodiment, any time suited to actual situation may be used for this time out time.

In the step S1902, if it is determined that transmission of remote message data was not executed normally because, for instance, there is no response form the communication control unit 604 or 607, and if it is determined in the above step S1905 that transmission of the message was not executed normally, the processing for the above step 1907 is executed. In the step 1905, if it is determined that the transmission was executed normally, then a message indicating that automatic transmission of the message is finished is provided on the operation display section 904 (S1908) to notify the user of it.

Figure 20:
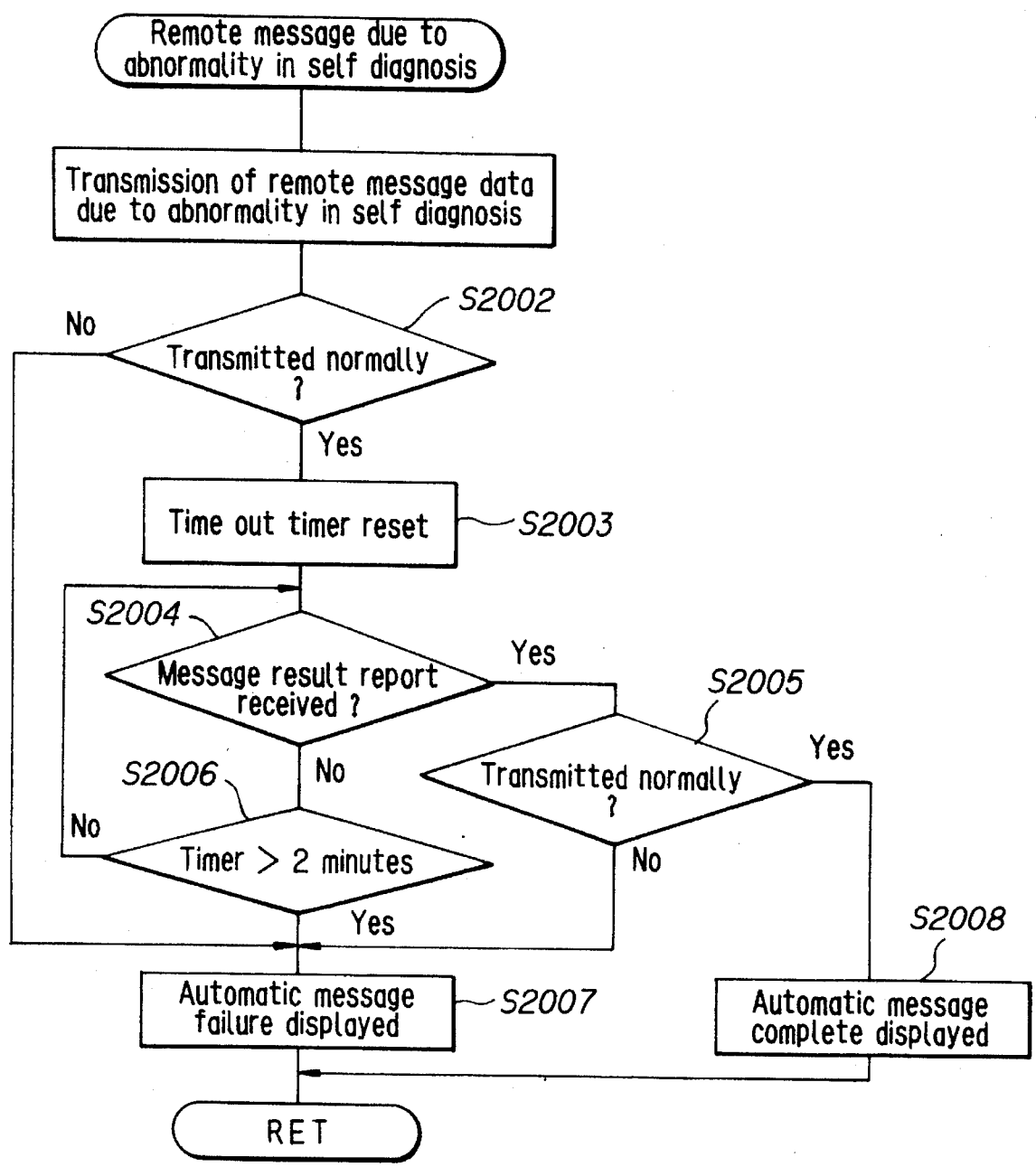
FIG. 20 is a flow chart illustrating operations for remote message control due to abnormality found during self diagnosis by a copying machine according to the present invention.

FIG. 20 is a flow chart illustrating operations for processing a remote message due to abnormality in self diagnosis by a copying machine according to the present invention. In this figure, at first transmission of a remote message due to abnormality in self diagnosis is executed to the communication control unit 604 or 607 (S2001), and then a determination as to whether the transmission was executed normally or not is executed (S2002). In this step, if it is determined that the remote message was transmitted to the communication control unit 604 or 607 normally, the timer for time put is reset (S2003), and furthermore a determination as to whether a message result report has been received from the communication control unit 604 or 607 or not is executed (S2004). Then if it is determined that the message result report has been received, a determination as to whether the message was transmitted normally or not is executed (S2005).

In the step S2004 above, if it is determined that a message result report from the communication control unit 604 or 607 has not been received yet, furthermore a determination as to whether the operation for receiving the report was executed within twenty minutes or not is executed (S2006), and if it is determined that the operation for receiving the report was executed within twenty minutes, a message indicating failure of automatic transmission of a message is provided on the operation display section 904, and on the contrary if it is determined that the report was not received within twenty minutes, the system control returns to the step S2004. It should be noted that, although the time out time was set to twenty minutes in this embodiment, other time may be employed according to the actual necessity.

In the step S2002 above, if it is determined that the remote message data has not been transmitted normally because, for instance, there is not response from the communication control unit 604 or 607, and if it is determined in the step S2005 above that transmission of a message was not executed normally, a processing in the step S2007 above is executed. If it is determined in the step S2005 above that the message was transmitted normally, an message indicating that automatic message is over is provided on the operation display section 904 (S2008) to notice the user of it.

Figure 21:
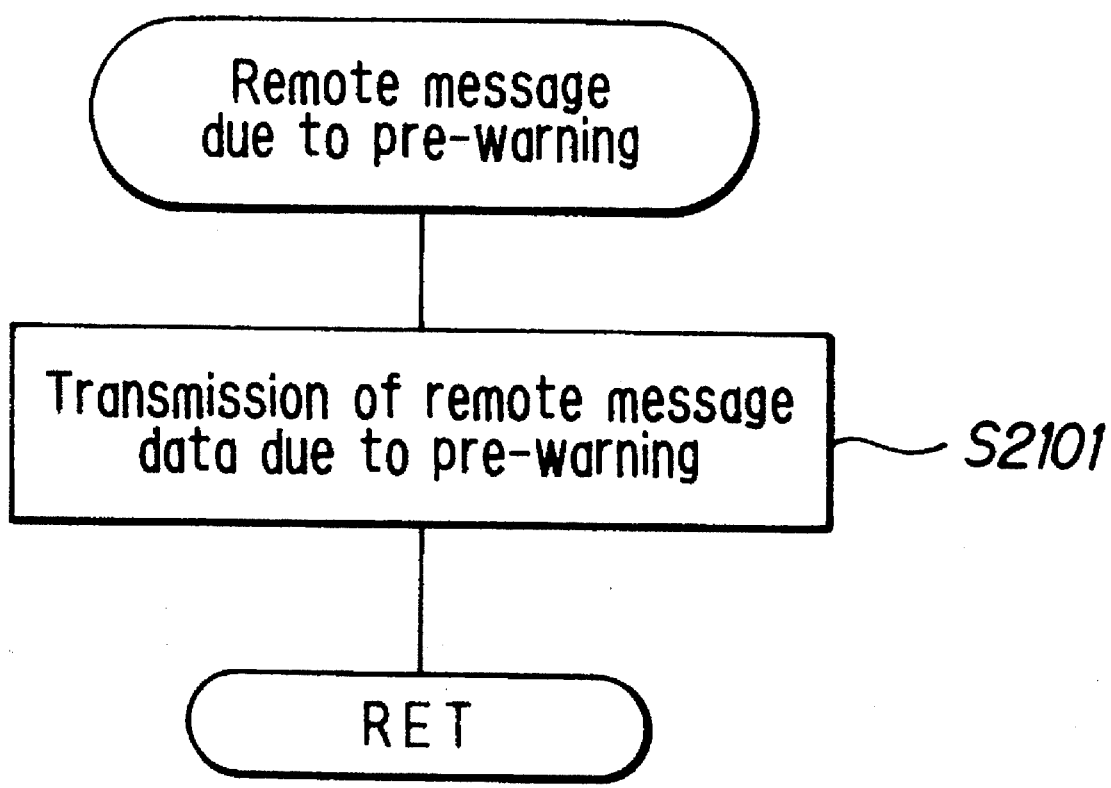
FIG. 21 is a flow chart illustrating operations for remote message control due to a pre-warning by a copying machine according to the present invention.

FIG. 21 is a flow chart illustrating operations for processing a remote message due to pre-warning from a copying machine according to the present invention, and transmission of remote message data due to pre-warning is executed to the communication control unit 604 or 607 (S2101).

Figure 22:
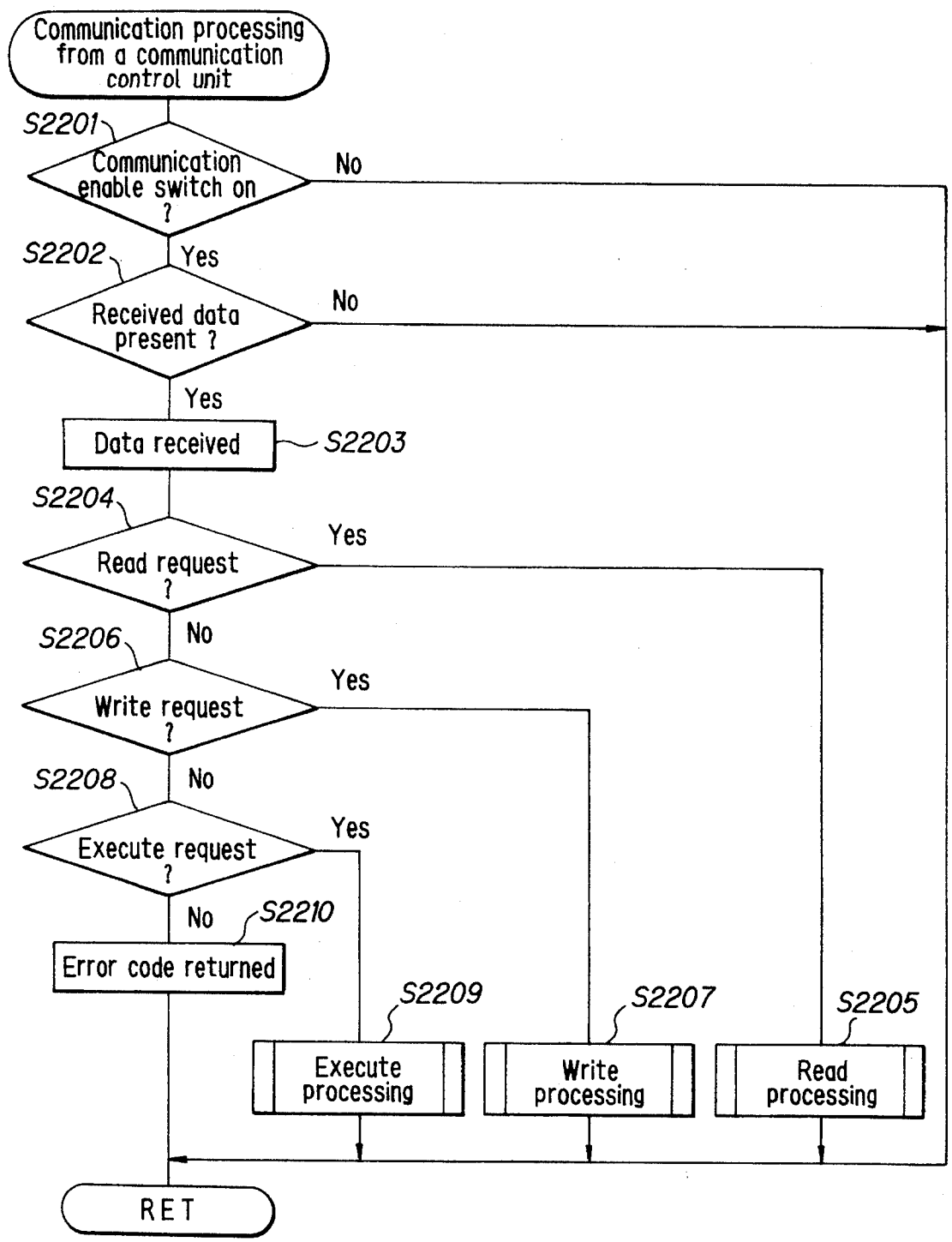
FIG. 22 is a flow chart illustrating operations of a copying machine when accessed from the communication control unit according to the present invention.

FIG. 22 is a flow chart illustrating a processing of a copying machine when accessed from the communication control unit according to the present invention. In this figure, at first a determination as to whether the communication enable switch 905 has been turned ON or not is executed (S2201), and if it is determined that the communication enable switch 905 has been turned ON, a determination as to whether received data is present in the communication interface unit 906 or not is executed (S2202), and if it is determined that there is received data, the received data is received (S2203).

Then a determination as to whether a read request is present in the header field or not is executed (S2202), and if it is determined that a read request is present, the read processing (Refer to FIG. 23) is executed (S2205), and this processing is finished. If it is determined in the step S2204 above that there is not a read request, furthermore a determination as to whether a write request is present or not is executed (S2206), and if it is determined that there is a write request, the write request (Refer to FIG. 24) is executed (S2207), and this processing is finished.

If it is determined in the step S2206 that there is not a write request, furthermore a determination as to whether an execute request is present or not is executed (S2208), and if it is determined that there is an execute request, the execute processing (Refer to FIG. 25) is executed (S2209), and this processing is finished. If it is determined in the step S2208 that there is not an execute request, namely if there is no code, error code is returned (S2210), and this processing is finished.

Figure 23:
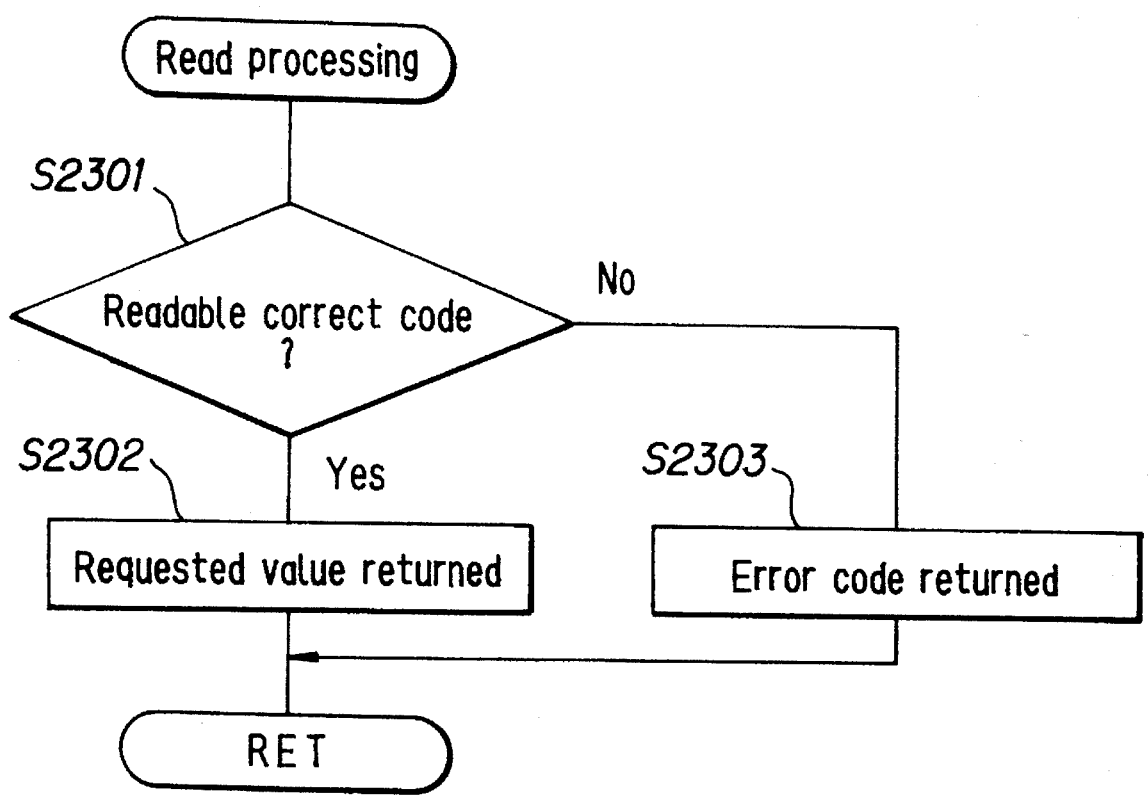
FIG. 23 is a flow chart illustrating a read operation according to the present invention.

FIG. 23 is a flow chart of the read processing according to the present invention, this read processing shows the processing in step S 2205 shown in FIG. 22. In this figure, at first a determination as to whether the code is a correct one which can be read or not is executed (S2301), and if it is determined that the code is a correct one which can be read, a requested value is returned (S2303), and this processing is finished. Also if it is determined in the step S2301 that the code is not a correct one which can be read, error code is returned (S2303), and this processing is finished.

Figure 24:
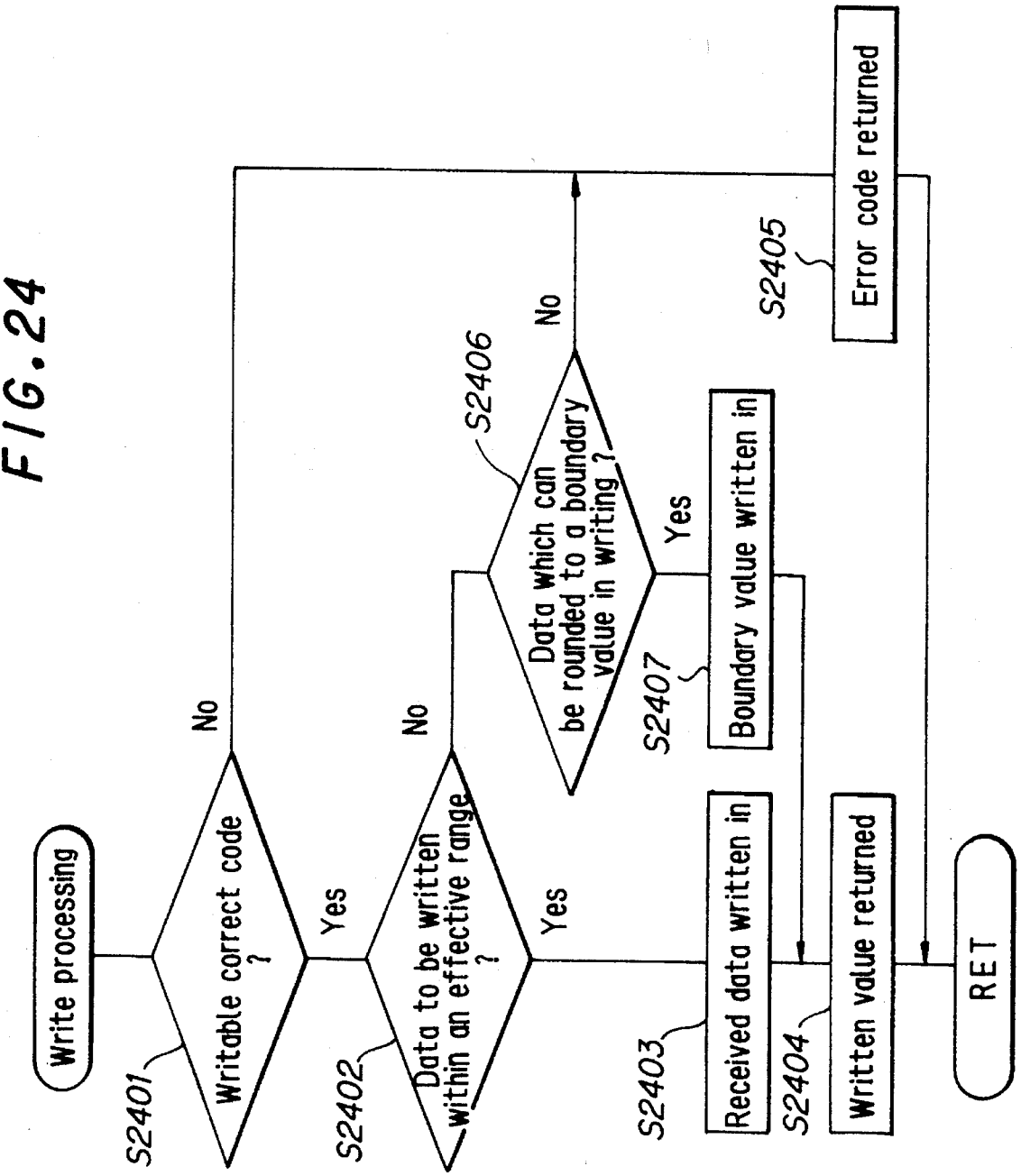
FIG. 24 is a flow chart illustrating a write operation according to the present invention.
Figure 27:
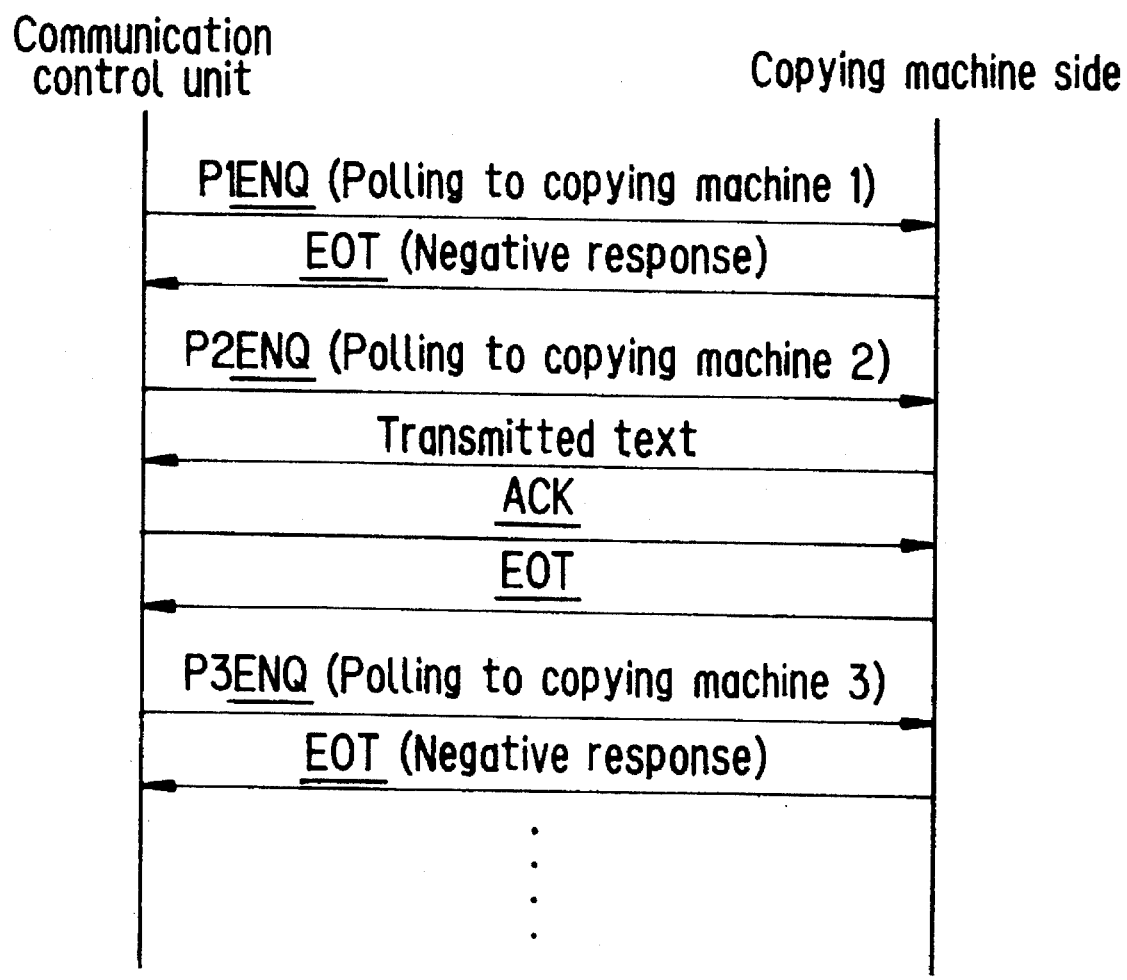
FIG. 27 is an explanatory view illustrating a communication sequence when a text of remote message for a copying machine at address 2 according to the present invention is to be transmitted.

FIG. 24 is a flow chart illustrating operations for the write processing according to the present invention, and shows the processing in the step S2207 in FIG. 27 above. In this figure, at first a determination as to whether the code is a correct one which can be written or not is executed (S2401), and if it is determined that the code is a correct one which can be written, furthermore a determination as to the value to be written is within the effective range or not is executed (S2402), and if it is determined that the value to be written is within the effective range, the received data is written as it is (S2403). Furthermore the written value is returned (S2404), and this processing is finished.

In the step S2401, if it is determined that the item is not a correct one which can be written, error code is returned (S2405), and this processing is finished. Also in the step S2402, if it is determined that a value to be written is outside the effective range, a determination as to whether the item may be written by rounding the value into a boundary value within the effective range or not is executed (S2406). In this step, if it is determined that the item may be written by rounding the value into a boundary value within the effective range, the boundary value is written (S2407). In the step S2406, if it is determined that the item must not be written by rounding the value into a boundary value, error code is returned (S2405), and this processing is finished.

It should be noted that, in the step above, it is inhibited to round a value which gives large influence even if it is within the effective range when rounded or to round such a value as a telephone number of a service center having no significance whether or not the value is large or small. On the other hand, in case of an item, such as a time for automatic resetting, which gives no influence over a quality of image, rounding the value into a boundary value is permitted. For instance, if it is desired to make a time for automatic resetting as long as possible, by setting the value to be written to the maximum value within the allowable number of digits, the maximum value is selected by the copying machines 601 through 603, 605, and 606.

Figure 25:
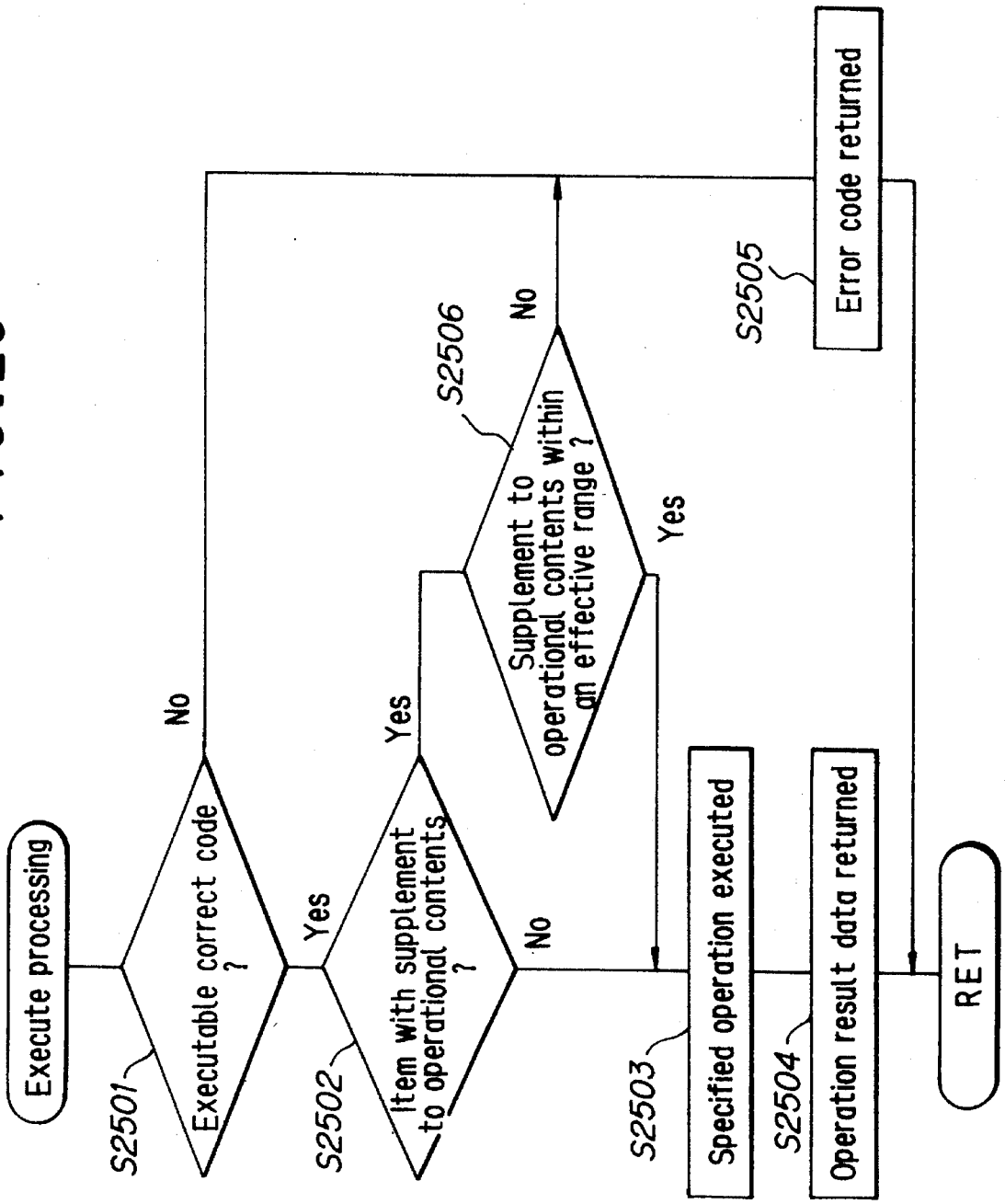
FIG. 25 is a flow chart illustrating an execute operation according to the present invention.

FIG. 25 is a flow chart illustrating operations for the execute processing according to the present invention, and shows the processing in the step S2209 in FIG. 22 above. In this figure, at first, a determination as to whether the item is a correct one which can be executed or not is executed (S2501), and if it is determined that the item is a correct one which can be executed, furthermore a determination as to whether the item requires supplement of contents of the operation or not is executed (S2505). In this step, if it is determined that the item does not require supplement of contents of operation, the specified operation is executed (S2503), the operation result data is returned (S2504), and this processing is finished.

In the step S2501, if it is determined that the item is not a correct one which can be executed, error code is returned (S2505), and this processing is finished. If it is determined in the step S2502 that the item requires supplement of contents of item, furthermore a determination as to whether the value for supplement of contents of operation is within the effective range or not (S2506), and if it is determined that the value for supplement of contents of operation, operations in the step S2503 and after are executed, and if it is determined that the value for supplement of contents of operation is outside the effective range, error code is returned (S2505), and this processing is finished.

Figure 26:
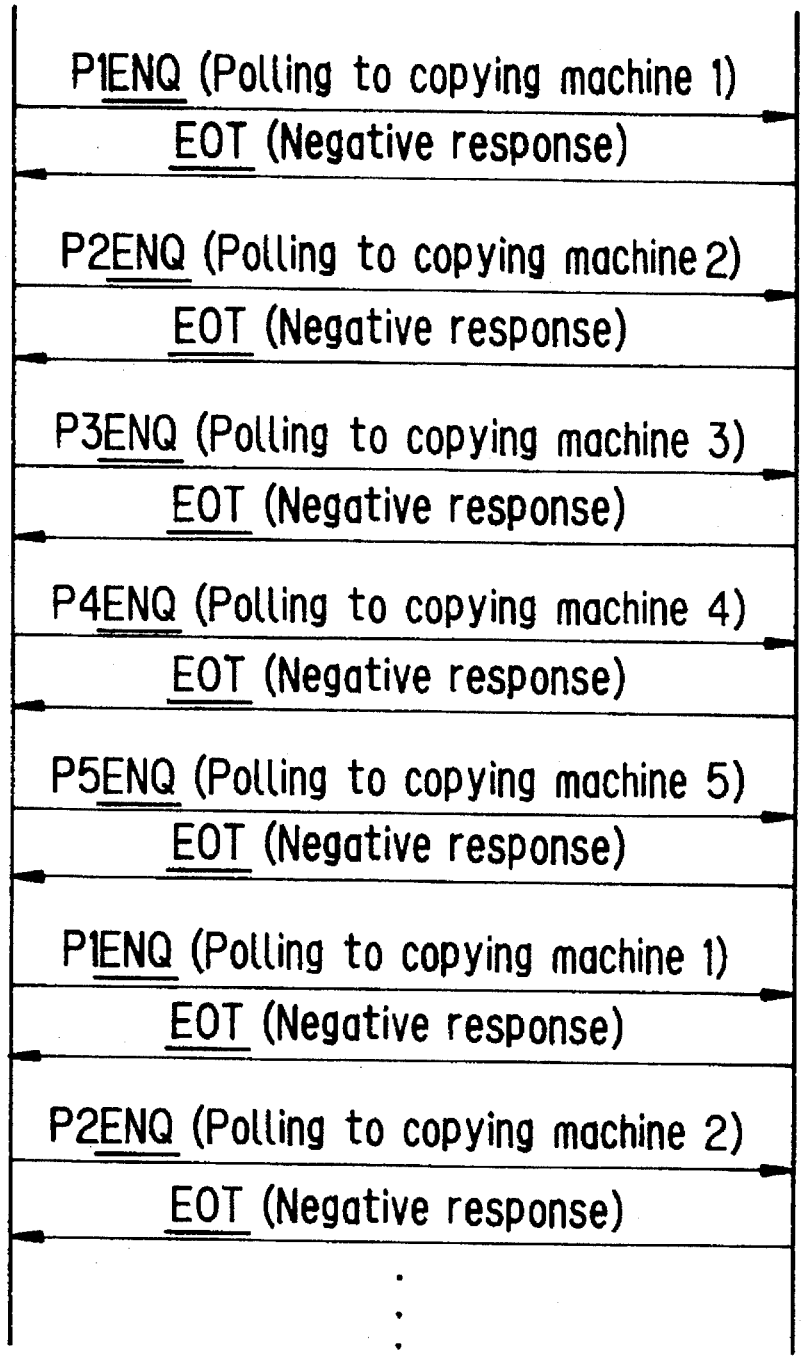
FIG. 26 is an explanatory view illustrating communication sequence in an idle state when five units of copying machine are connected to the communication control unit according to the present invention.

Next description is made for a sequence for communication between the communication control units 604, 607 and copying machines 601 through 603, 605, 606. FIG. 26 is an explanatory view illustrating a sequence for communications in an idle state in a case where 5 units of copying machines 601 through 603, 605,606 are connected to the communication control units 604 and 607. In this figure, the reference numerals P1 to P5 indicates copying machines as targets for polling, S5 indicates the copying machine 606 specified by address 5 which is one of the targets for selection, ENG indicates an inquiry for status, ACK indicates an affirmative response, and EOT indicates a transfer control character indicating that transfer is over.

Herein, the communication control units 604 and 607 execute a polling cycle in which a polling sequence is transmitted successively using polling addresses for the copying machines 601 through 603, 605, 606. In this step, a copying machine polled with a polling address for the machine itself sends a negative response to the communication control units 604 or 607 if there is no text to be transmitted. If there is not item to be processed for communication, this polling cycle is executed repeatedly.

FIG. 27 is an explanatory view for illustrating a communication sequence in a case where there is a text for remote message to be transmitted to the copying machine 602 at address 2 according to the present invention. In this figure, the copying machine 602 sends the text to be transmitted to a line of the RS-485 interface 709 after polled with an address for the copying machine.

Figure 28:
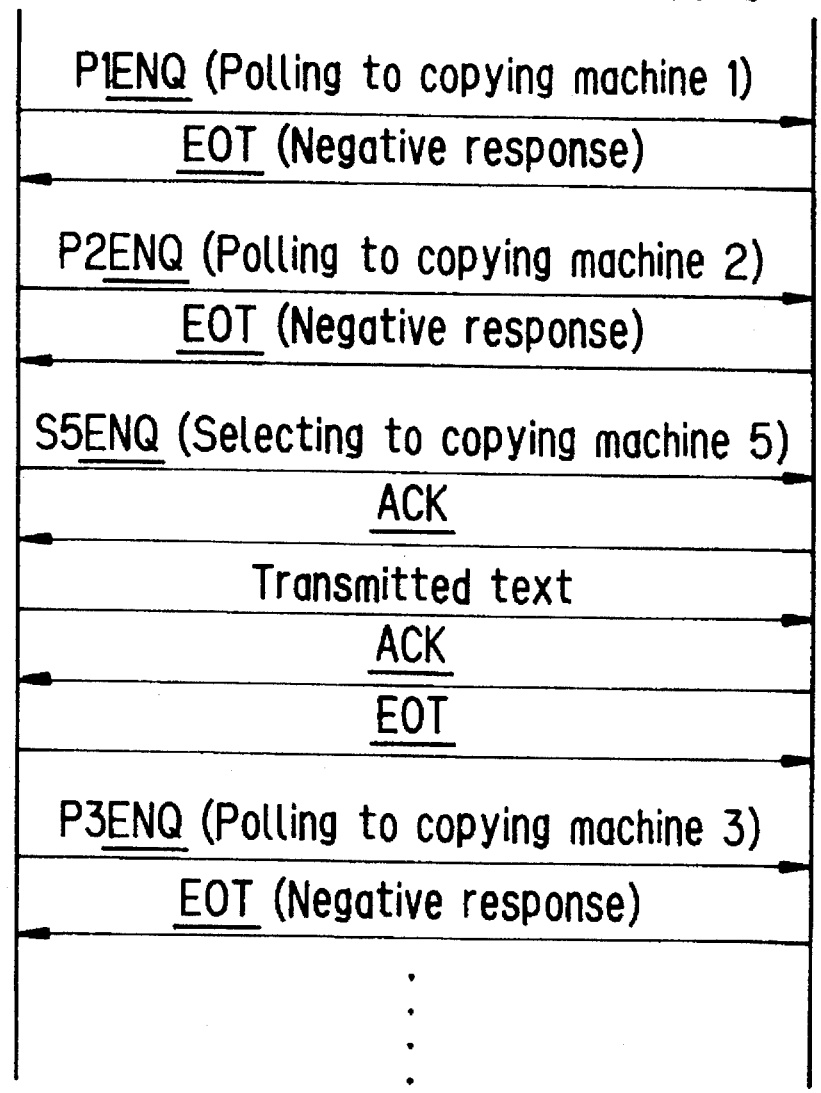
FIG. 28 is an explanatory view illustrating transmission of a text for reporting a result of massaging to a copying machine at address 5 from the communication control unit according to the present invention.

FIG. 28 is an explanatory view illustrating transmission of a text for a message result report from the communication control unit 607 according to the present invention to the copying machine 606 at address 5. Herein after polling being executed currently is complete, a selecting sequence is transmitted by using a selecting address for the target copying machine, and the test is transmitted to the copying machine. After the text is transmitted, the system control returns to the previous polling cycle.

Figure 29:
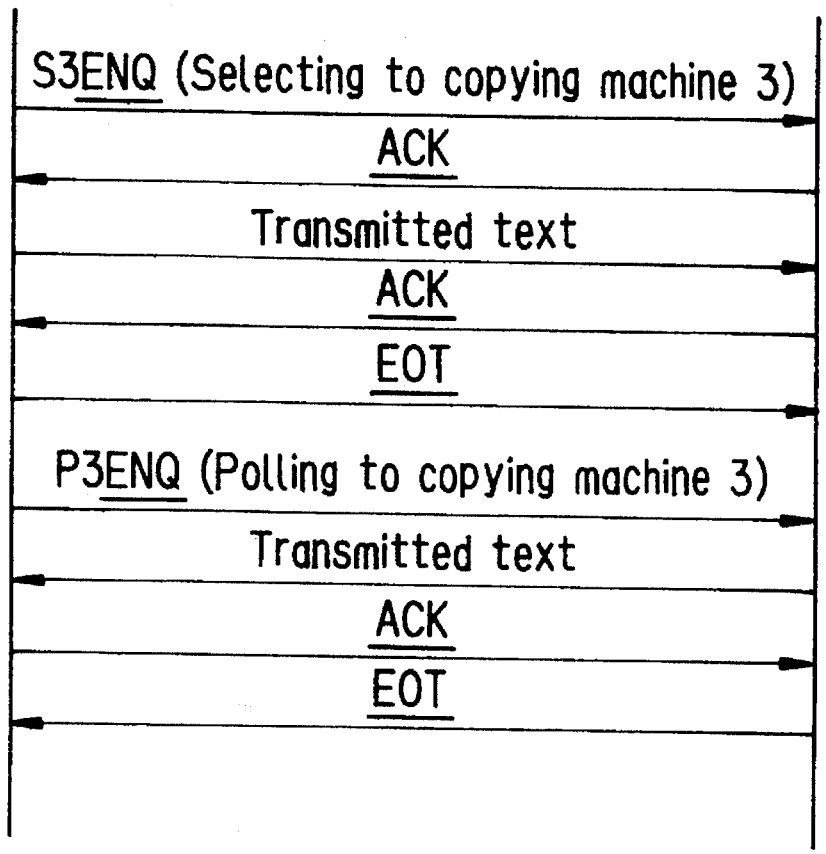
FIG. 29 is an explanatory view illustrating a communication sequence between a communication control unit and a copying machine when a copying machine at address 3 is accessed from the controller or the communication control unit according to the present invention.

FIG. 29 is an explanatory view illustrating a sequence of communication between the communication control unit 604 and the copying machine 603 in a case where the copying machine 603 at address 3 is accessed from the controller 611 or the communication control unit 604 according to the present invention. The communication control unit 604 selects a target copying machine 603, and a text for any of a read request, a write request, and an execute request is selected to the copying machine 603. Immediately after this operation, polling is executed to the same copying machine 603, and receiving a response to the request is executed. Actually this sequence in inserted in the polling cycle shown in FIG. 26.

Figure 30:
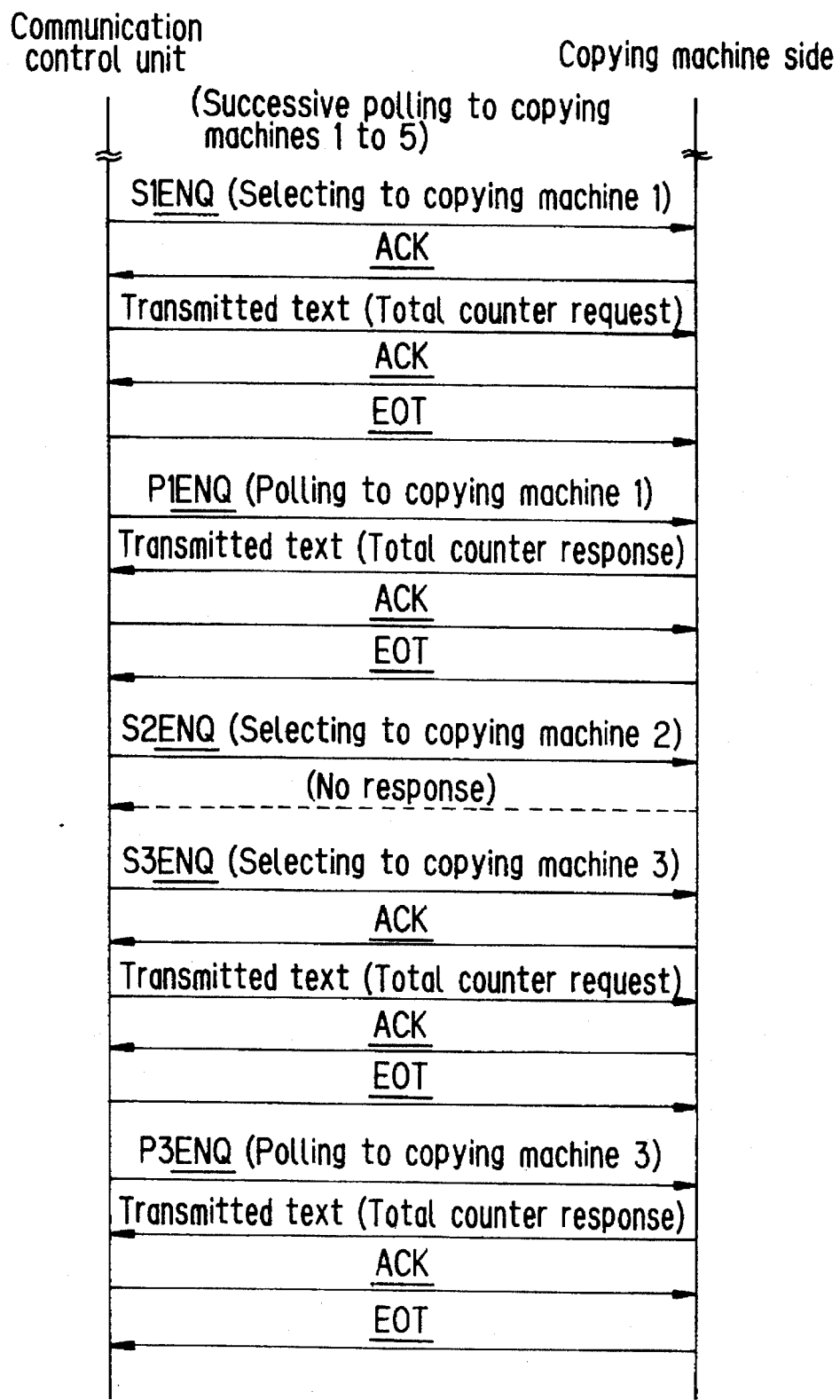
FIG. 30 is a sequence for transferring a count value concerning a total number of sheets of used copy paper according to the present invention, said sequence being executed periodically.
Figure 31:
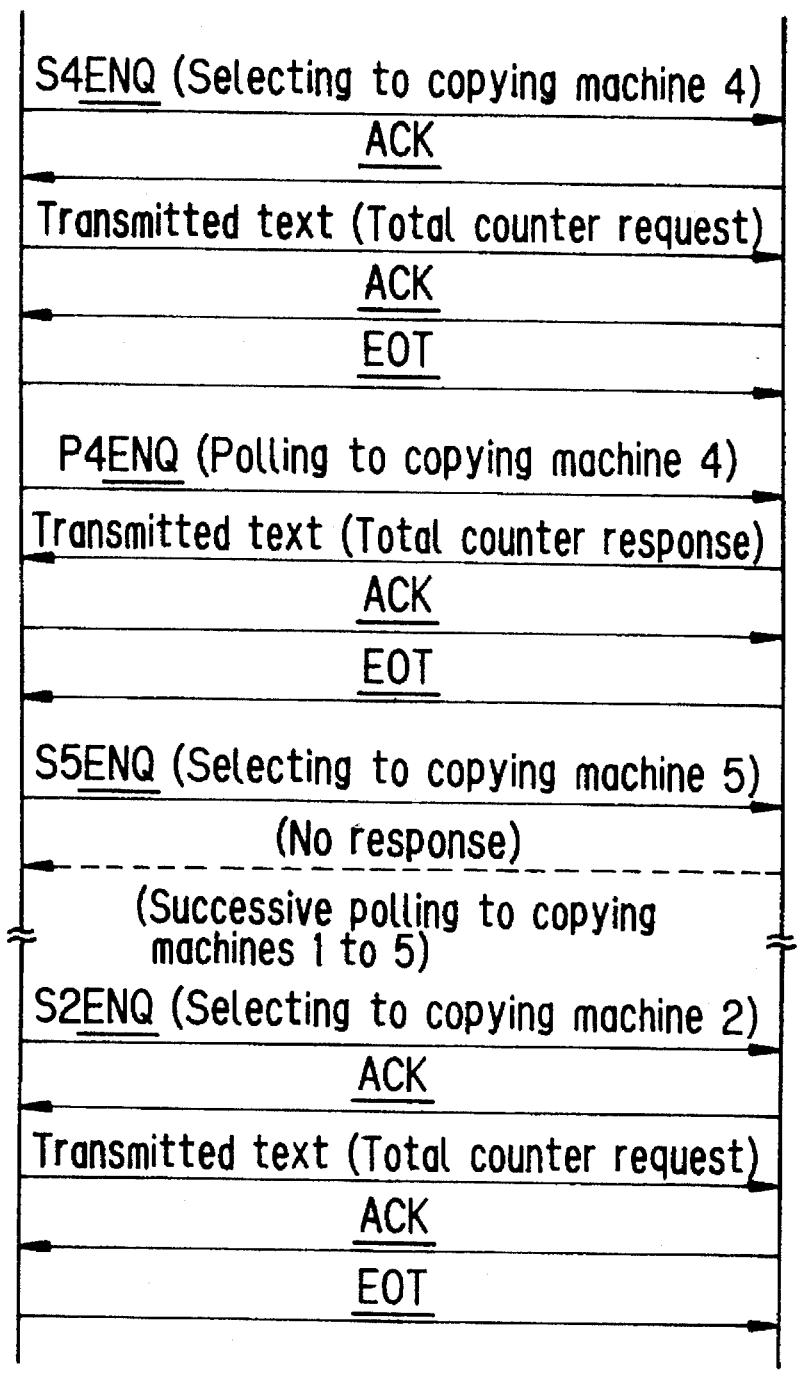
FIG. 31 is an explanatory view illustrating a sequence for transferring a count value of a total number of sheets of used copy paper periodically executed according to the present invention.
Figure 32:
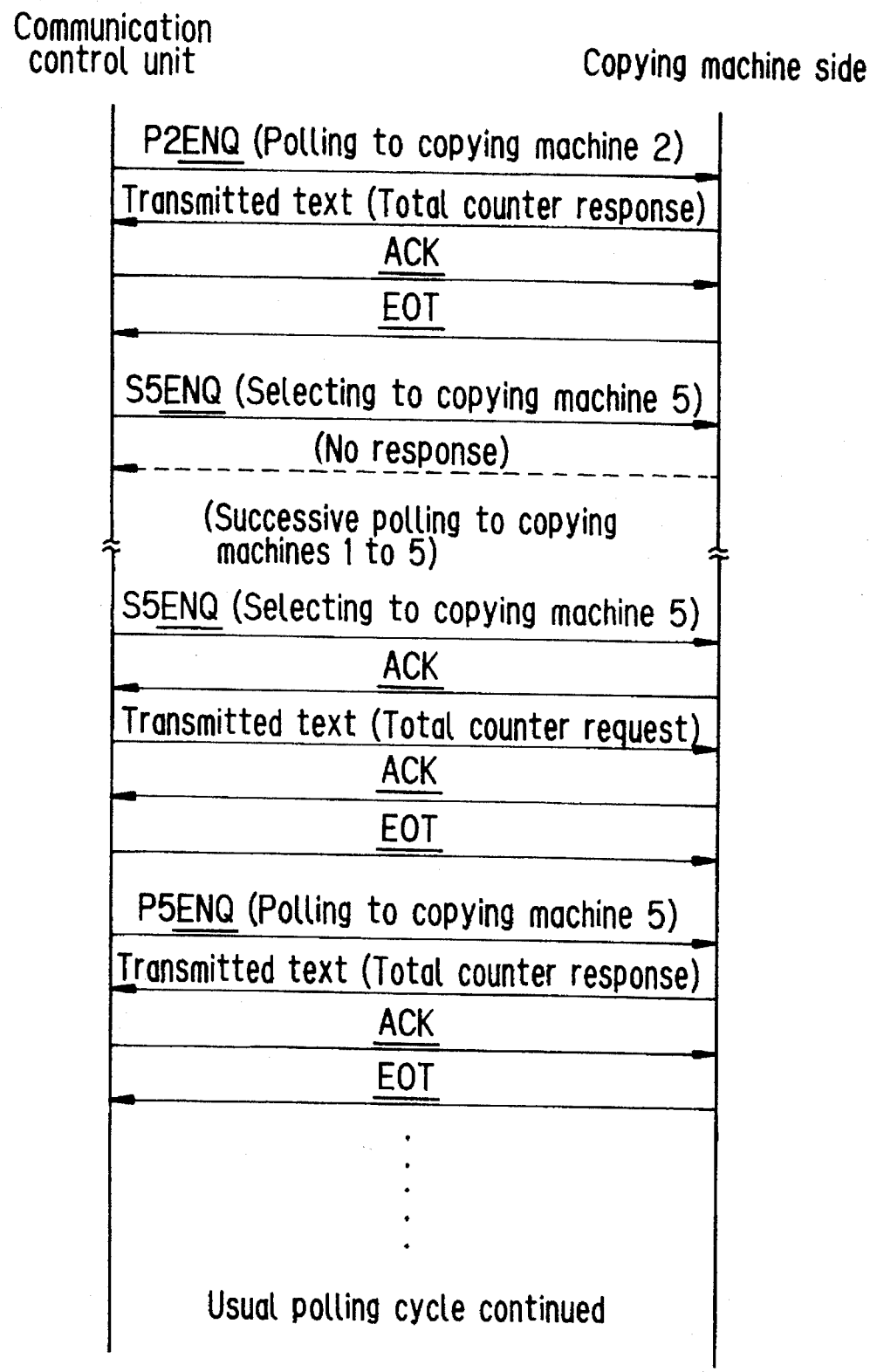
FIG. 32 is an explanatory view illustrating a sequence for transferring a count value of a total number of sheets of used copy paper periodically executed according to the present invention.

FIG. 30 to FIG. 32 are explanatory views each illustrating a sequence for transferring a count value indicating a total number of sheets of used copy paper periodically executed. Herein, when a time for collecting a counter value indicating a total number of sheets of used copy paper comes, the communication control unit 604 or 607 inserts a selecting cycle successively to the copying machines 601 through 603, 605, 606 at addresses 1 to 5 respectively during the polling cycle. If there is a response returned during the selecting cycle, the polling cycle is executed to the same copying machine immediately after the response is received, so that a selecting cycle to the copying machine is not executed in the next selecting cycle.

In this embodiment, selecting is executed to only the copying machines 601, 603, and 605 at address 1, 3, and 4 respectively in the first selecting cycle. Then receiving all data for all the copying machines is complete in the selecting cycle, and the state described in relation to FIG. 26 where only the normally polling cycle is executed is restored.

Figure 33:
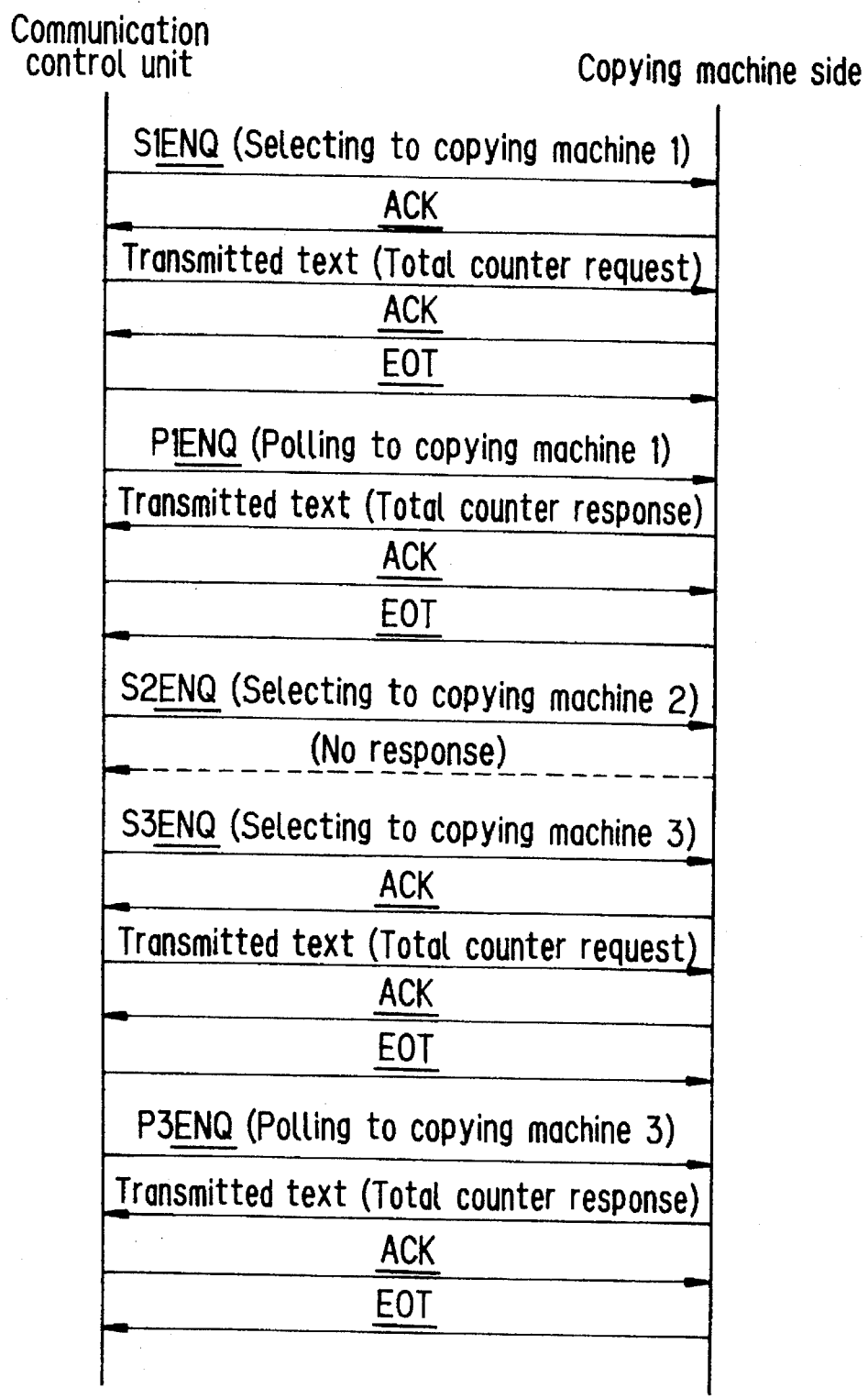
FIG. 33 is an explanatory view illustrating a sequence for transferring a count value of a total number of sheets of used copy paper according to the present invention.
Figure 34:
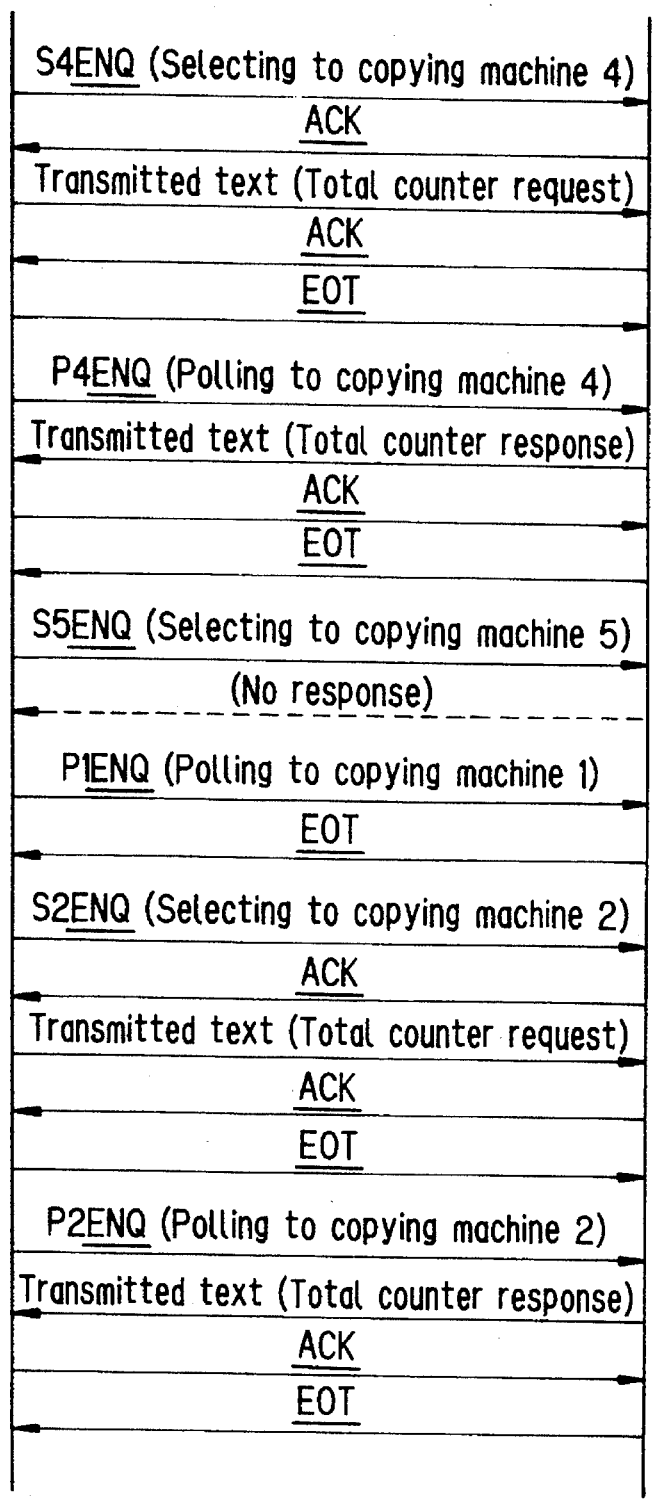
FIG. 34 is an explanatory view illustrating a sequence for transferring a count value of a total number of sheets of used copy paper according to the present invention.
Figure 35:
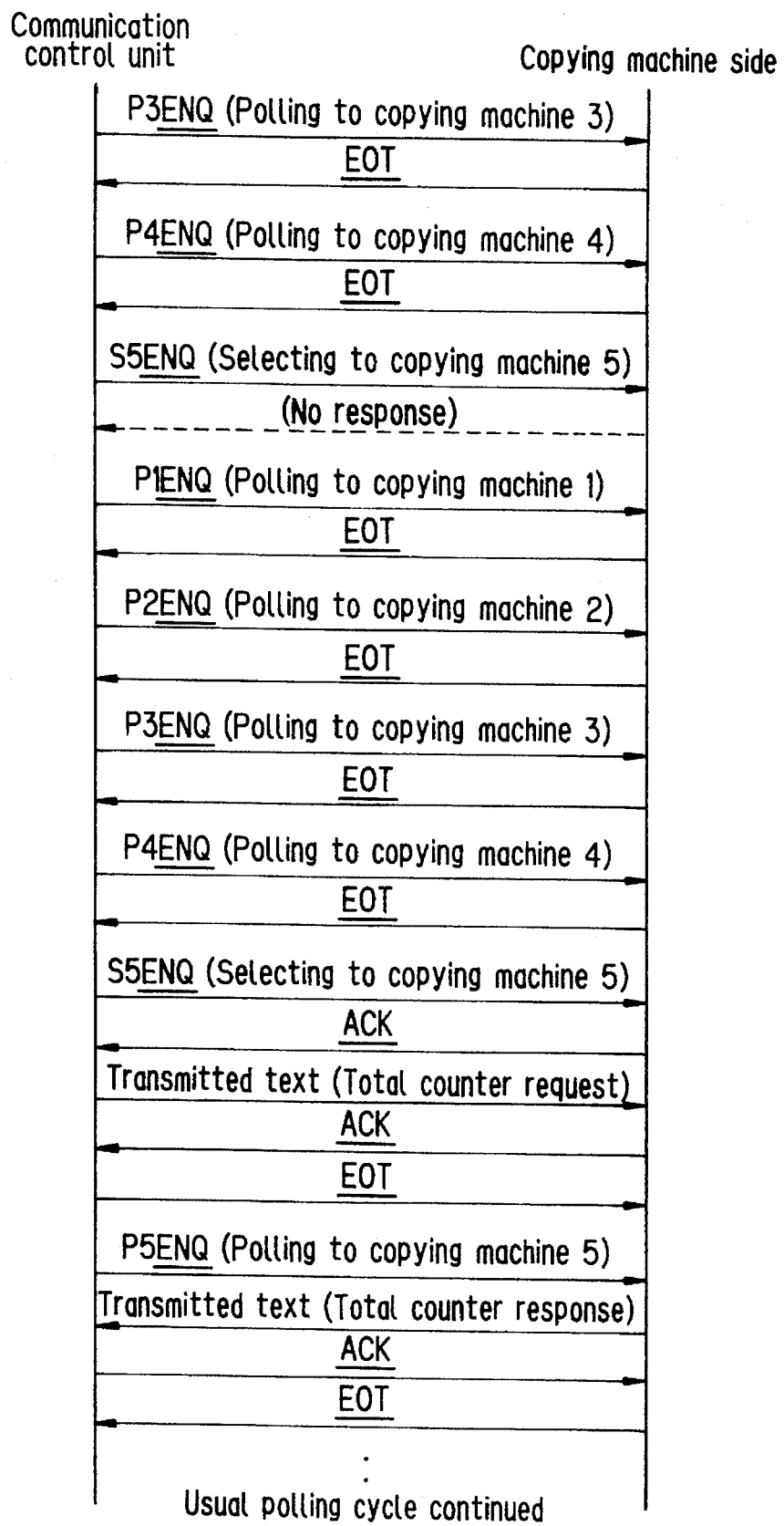
FIG. 35 is an explanatory view illustrating a sequence for transferring a count value of a total number of sheets of used copy paper.

FIG. 33 to FIG. 35 are explanatory views each illustrating a sequence for transferring a counter value indicating a total number of sheets of used copy paper. Herein when a time for collecting a counter value for a total number of sheets of used copy paper comes, selecting is executed in place of polling at a timing for execution of polling to the copying machines 601 through 603, 605, 606. Then polling is executed to copying machines returning a response to selecting immediately the response is received, and data receiving is executed.

The first cycle to the copying machines 601 through 603, 605, 606 at addresses 1 to 5 immediately after a time for collecting a counter value for a total number of sheets of used copy paper has come is the same as that shown in FIG. 30 to FIG. 32, but a polling sequence is not inserted after it. In the second cycle, polling is executed to the copying machines having received the data, while selecting is again executed to request a counter value to the copying machines not having received the data.

When all the copying machines 601 through 603, 605, 606 have received the data, a normal state where only polling is executed is restored. Namely FIG. 33 to FIG. 35 show a case like that shown in FIG. 30 to FIG. 32 in which a response is returned from the copying machines 601, 603, and 605 at addresses 1, 3 and 4, the copying machine 602 at address 2 among those not having the previous data in the next cycle have received the data, and all the copying machines 601 to 603, 605, 606 could received the data in the next cycle.

Also in the present invention, in addition to the periodical data processing as described above, the following processing are executed. Namely when a data specified by a parameter set up in the communication control units 604 and 607 comes, call is placed to a telephone number of a target for message specified by a parameter specified in the communication control units 604 and 607, and a counter value indicating a total number of sheets of used copy paper is sent to the controller 611. However if such troubles as power failure for the communication control units 604 and 607 or a case where the specified date is February 29 present only in a leap year and there occur a year in which total count processing can be executed and a year in which total count processing can not be executed are generated, some troubles occur in the system administration.

If any trouble as described above should occur, in this present invention, if the processing is not finished on a date specified by the parameter, monitoring is executed continuously and operations are executed until the processing is finished. For instance, in a year in which there is not February 29th, the processing is executed on March 1. Detailed description is made for this operation with reference to the flow chart shown in FIG. 39.

Figure 39:
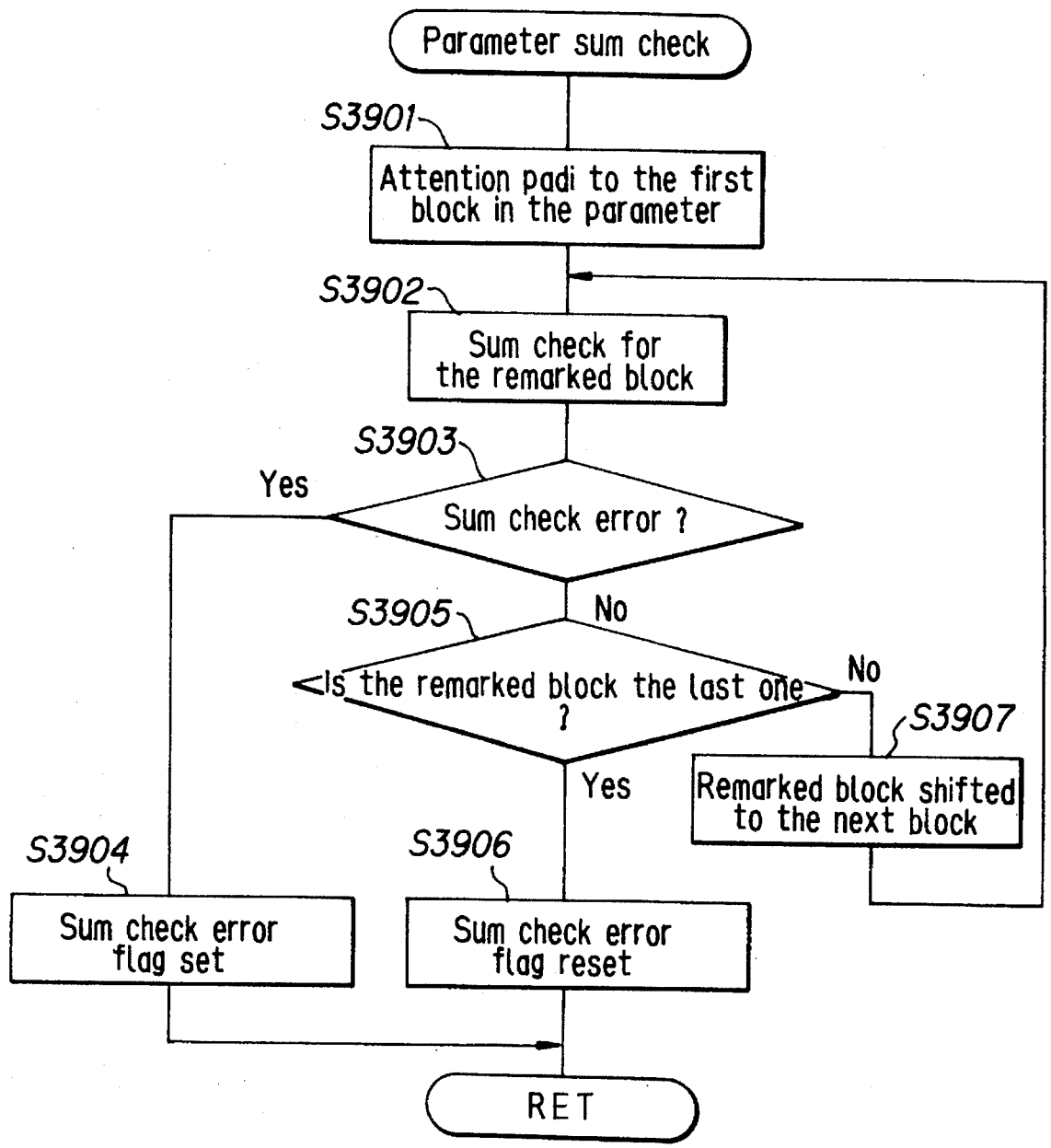
FIG. 39 is a flow chart illustrating an operation for a parameter sum check processing according to the present invention.

FIG. 39 is a flow chart illustrating operations for a parameter sum check processing according to the present invention. It should be noted that the parameter sum check is a processing for making a determination as to whether the parameters set in the communication control units 604 and 607 (Refer to FIG. 38) are correct or not. Also as shown in FIG. 38, each parameter set in the communication control units 604 and 607 is divided to a plurality of blocks, and check sum is added to each block.

In FIG. 39, at first a first block is remarked (S3901), then sum check for the remarked block is executed (S3902), and sum check for each block is executed successively. In this step, a determination as to whether a sum check error has been generated or not is executed (S3903). In this step S3903, if it is determined that a sum check error has been generated, a sum check error flag is set (S3904), and this check processing is finished.

In the step S3903 above, if it is determined that a sum check error has not been generated, furthermore a determination as to whether the remarked block is the final block or not is executed (S3905), and if it is determined that the remarked block is the final one, the sum check error flag is reset (S3906), and this processing is finished. On the other hand, in the step S3905 above, if it is determined that the remarked block is not the final block, the next block is remarked (S3907), and the system control returned to the step S3902, where sum check is executed.

The present system controls data for a plurality of copying machines 601 through 603, 605, 606, but at present copying machines have been becoming more and more sophisticated as shown in the examples of colorization or digitization, and in the past one unit of total counter was installed in one unit of copying machine, but recently sometimes a plurality of total counters may be installed in one unit of copying machine, so that up to 3 units of total counter can be connected to one unit of copying machine in this embodiment. In this step, if the total counter value is divided to an individual total counter value for each copying machine and is sent one by one to a service center, additional transmission cost is required, so that, if there is any data to be transmitted, the total value is sending batch to improve the economical performance of the system.

Also the communication control units 604 and 607 according to the present invention has such functions as that for temporally storing data for the copying machines 601 through 603, 605, 607 and that for automatically calling the receiving side.

If data is transferred through a public line, the communication fee increases in proportion to the use time or a distance of communication, but in this embodiment the following processing is executed to minimize the communication fee.

In such a system as personal computer communication currently available, a line is connected each time communication is executed, so that the basic fee is accounted even in short time communication each time the communication is executed. For this reason, the communication control units 604 and 607 have a function to transmit in batch data which is stored in the units and can be sent in batch. Also if new data comes, while a particular receiving side is busy and an opportunity for recall is waited, to the same receiving side, a count for times of recalling to the receiving side is initialized, and a time zone in which connection to the receiving side is possible is widened. Detailed description is made for operations for this processing with reference to the flow chart shown in FIG. 40.

Figure 40:
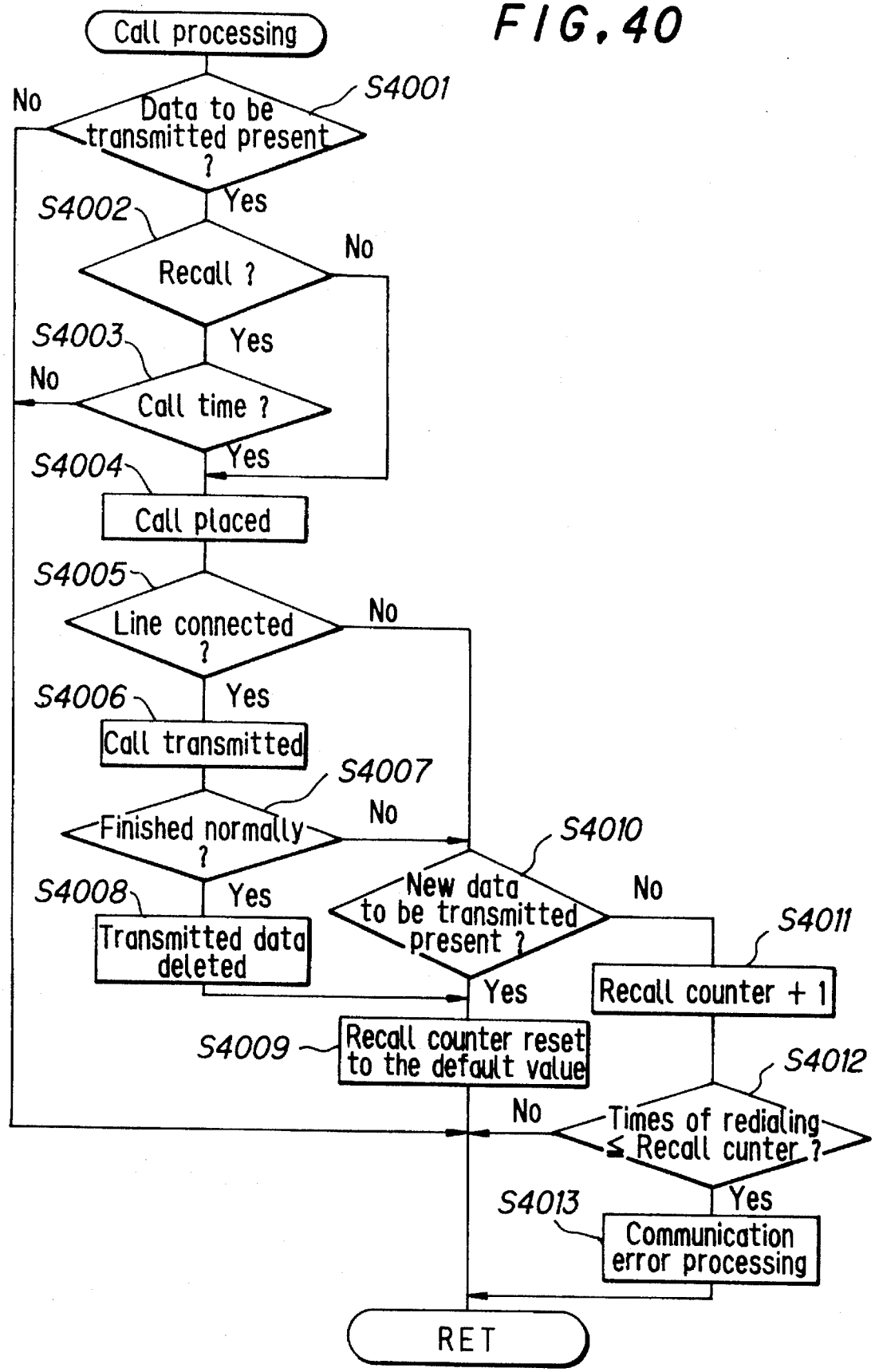
FIG. 40 is a flow chart illustrating a call processing operation according to the present invention.

FIG. 40 is a flow chart illustrating operations for call processing according to the present invention. In this figure, a determination as to whether there is any data for transmission is present or not (S4001). In this step, if it is determined that there is no data to be transmitted, this processing is repeated again. On the other hand, if it is determined in the step S4001 that there is data to be transmitted, furthermore a determination as to whether it is necessary to recall or not is executed (S4002). In this step, if it is determined that it is necessary to recall, furthermore a determination as to whether the current time is within the time for calling or not is executed (S4003), and if it is determined that the current time is within the time for calling, calling is executed (S4004). If it is determined in the step S4002 that it is not necessary to recall, then calling step S4004 is executed without executing decision step S4003.

Then a determination as to whether line connection has been established or not is executed (S4005). In this step S4005, if it is determined that line connection has been connected, transmission is executed (S4006), and furthermore a determination as to whether the transmission has been finished normally or not is executed (S4007). In this step, if it is determined that the transmission has been finished normally, the data to be transmitted is deleted (S4008), the count of times of recalling is initialized (S4009), and this processing is returned.

On the other hand, if it is determined in the step S4005 that line connection has not been established, or if it is determined in the step S4007 that the transmission has not been finished normally, furthermore a determination as to whether there is any new data to be transmitted or not is executed (S4010). In this step S4010, if it is determined that there is any new data to be transmitted, the recall counter is initialized (S4009), and this processing is returned.

In the step S4010, if it is determined that there is no new data to be transmitted, a recall counter is incremented by 1 (S4011), and furthermore a determination as to whether the times of redialing is equal to or smaller than a count provided by the recall counter or not is executed (S4012). In this step S4012, if it is determined that the time of redialing is equal to or smaller than the count provided by the recall counter, a communication error processing is executed (S4013), and this processing is returned. On the other hand, if it is determined in the step S4012 above that the times of redialing is larger than the count provided by the recall counter, similarly this processing is returned.

The communication control units 604 and 607 above have a function to temporally store data for each copying machine. If data transmission is executed by using the public line, a communication fee in proportion to a time of use or distance of call is charged, but in this system, the following operations are executed to reduce the communication fee.

In data communication making use of a personal computer which is popular nowadays, a line connection is executed each time the data communication is executed, so that every time a basic charge is disadvantageously demanded even for short period communication. The communication control units 604 and 607 according to the present invention, however, have a function to send in batch data, namely internal data which can be sent in batch. Also the capability to connect to a receiving side can be widened by initializing a recall times counter for the receiving side (for instance, a counter for times of redialing due to abnormality in self diagnosis) if there occurs new data to be transmitted to a particular receiving side while the receiving side is busy and an opportunity for sending a call is waited.

The recall times counter may repeat calling until times of recalling becomes equal to a redial times value previously specified by counting up each time the receiving side is busy, or may execute error processing by setting an initial value in the first call (for instance by removing a prespecified value of redial times to the redial times counter), counting down each time the receiving side is busy, and detecting the point of time when the count provided by the recall times counter becomes zero.

Furthermore, if the communication control unit and the controller are interrupted, while they are being used, because the facsimile machine 609 or the telephone 608 connected to the line is used, the recall times counter may stop counting up or down so that the times of recalling is limited to only those due to abnormality during communication.

Figure 41:
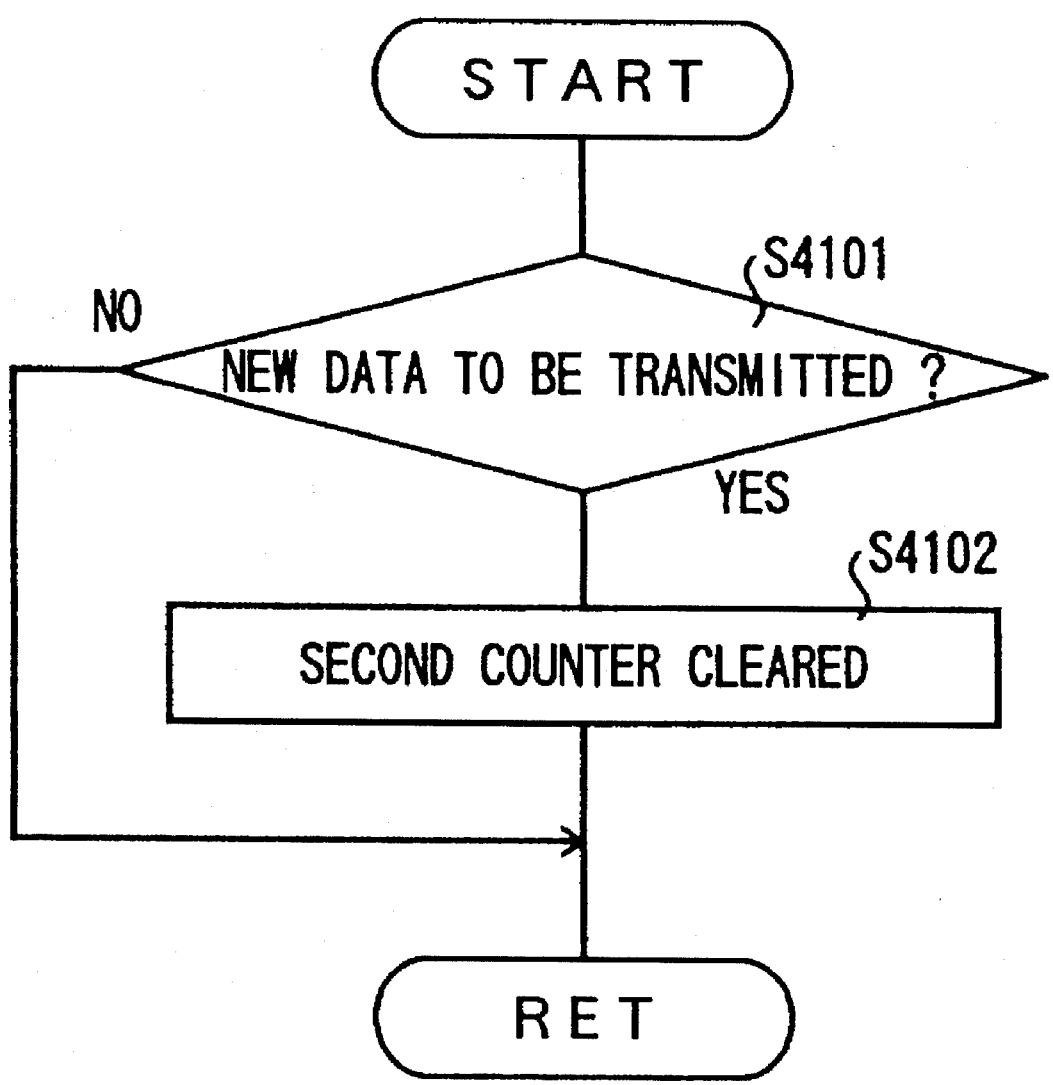
FIG. 41 is a flow chart illustrating operations of a system according to the present invention.
Figure 42:
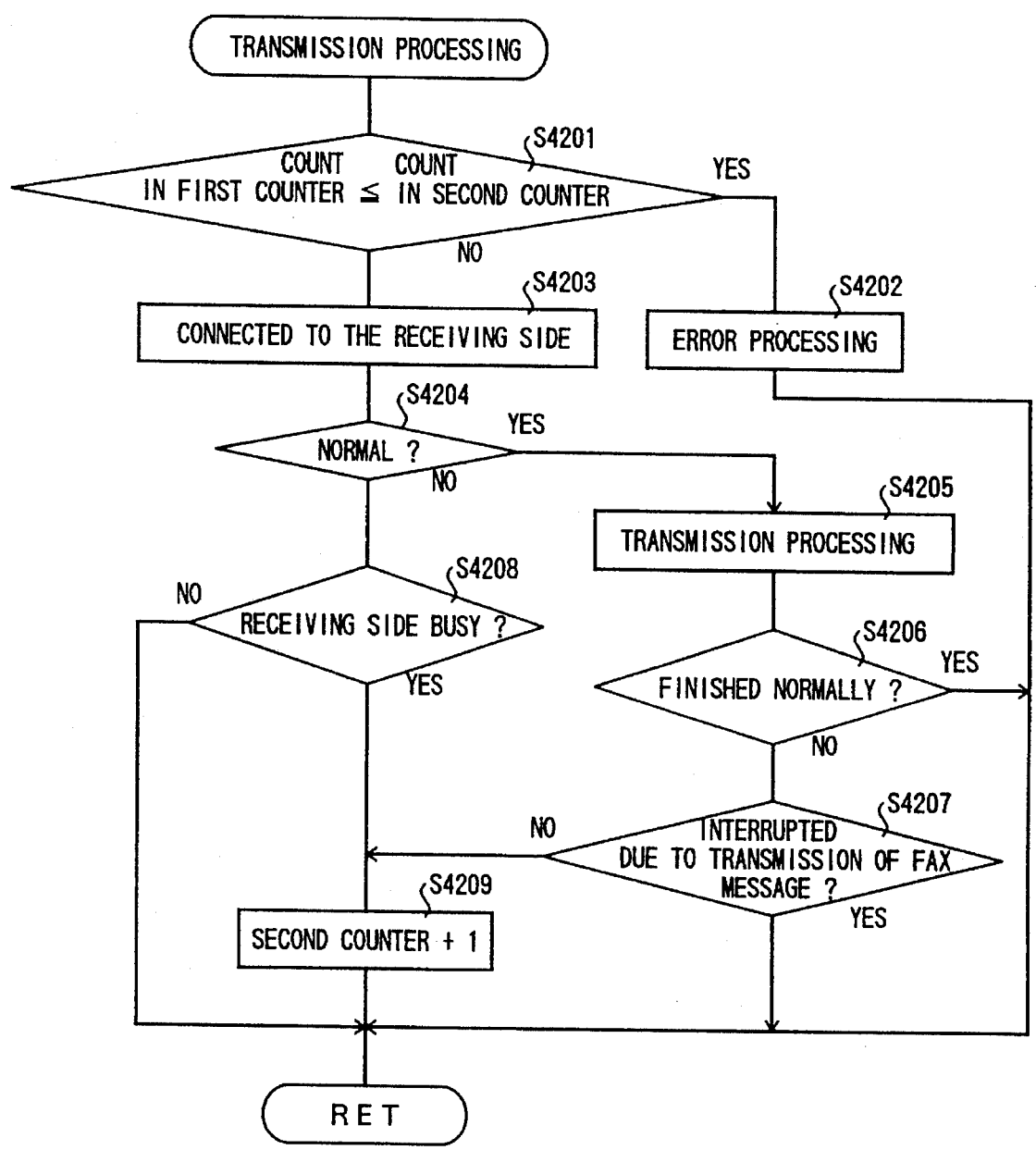
FIG. 42 is a flow chart illustrating operations of a system according to the present invention.

Description is made for the operation above with reference to the flow chart shown in FIG. 41 and in FIG. 42. In FIG. 41, at first a determination as to whether there has occurred any new data to be transmitted or not is executed (S4101), and if it is determined that there is new data to be transmitted, the second counter is initialized (S4102). Also in FIG. 42, a determination as to whether a value provided by the first counter is equal to or smaller than a value provided by the second counter or not is executed (S4201). Namely a determination as to whether Count by the first counter is less than or equal to the Count by the second counter or not is executed. As a result, if it is determined that the value provided by the first counter is equal to or smaller than a value provided by the second counter, an error processing is executed (S4202). On the other hand, if it is determined that the condition of a count by the first counter is less than or equal to the a count by the second counter is not satisfied, line connection to the receiving side is executed (S4203). Then a determination as to whether communication is normal or not is executed (S4204), and if it is determined that communication is normal, a transmission processing is executed (S4205).

After transmission is executed, a determination as to whether the transmission processing has been finished normally or not is executed (S4206), and if it is determined that the transmission has not been finished normally, a determination as to whether the transmission has been interrupted due to data transmission through a facsimile machine or not is executed (S4207). As a result, if it is determined that the transmission was not interrupted due to data transmission through a facsimile machine, a value in the second counter is incremented by 1 (counted up) and returned.

Figure 43:
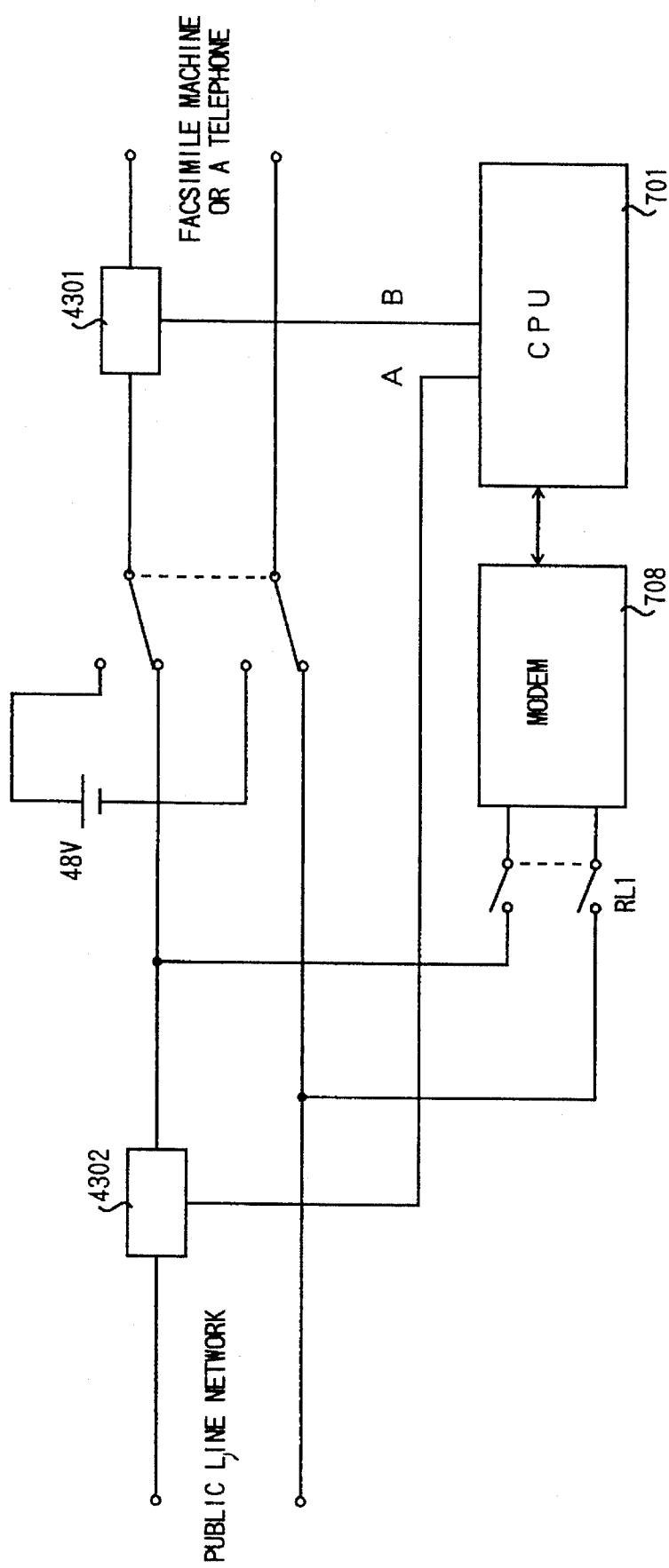
FIG. 43 is a block diagram illustrating a structure of a communication control unit according to the present invention.
Figure 44:
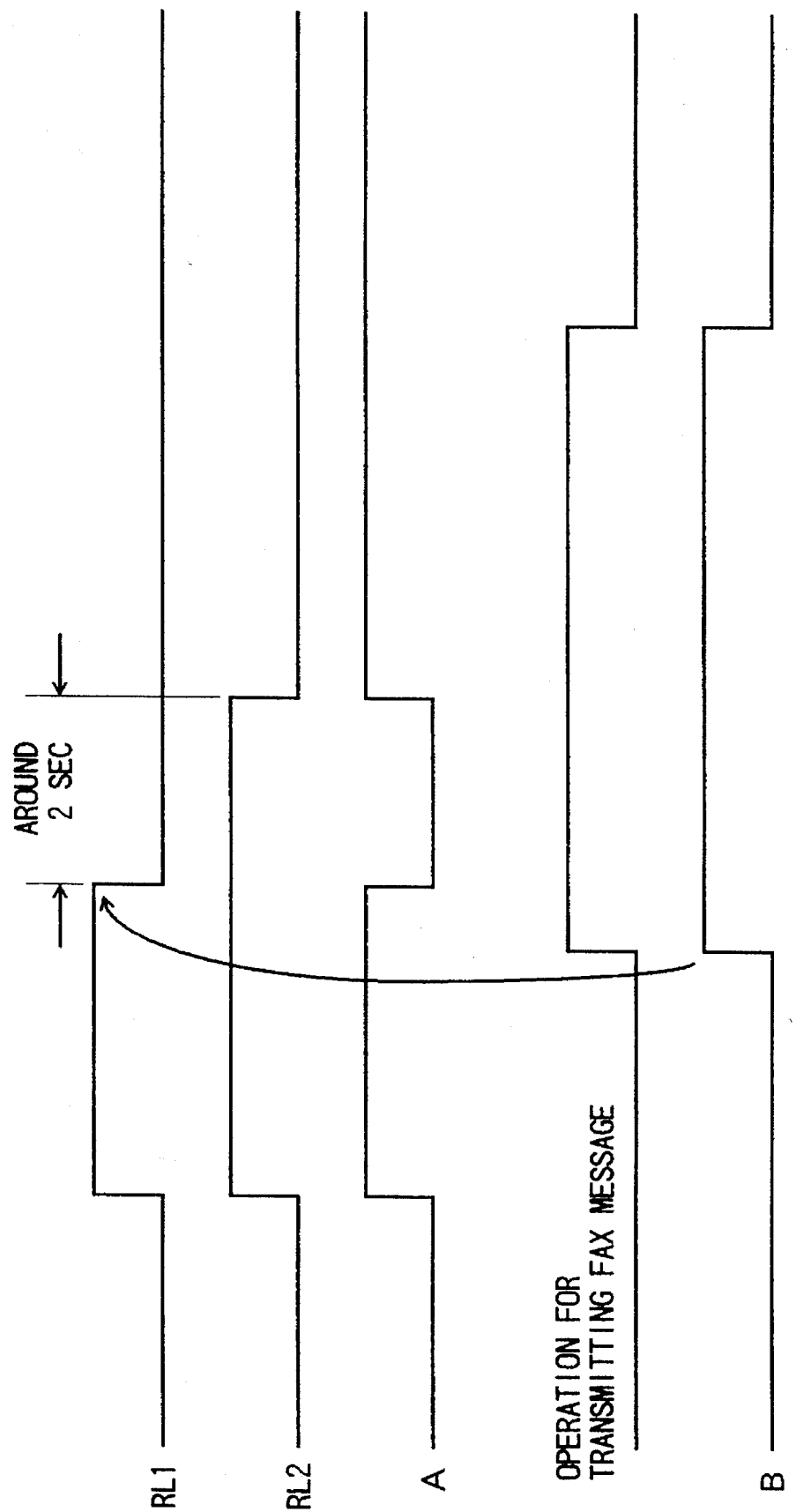
FIG. 44 is a timing chart illustrating operations of the communication control unit shown in FIG. 43.

FIG. 43 shows a portion of a circuit in the communication control units 604 and 607, and with this circuit a determination as to whether the facsimile machine 609 or the telephone 608 is used during communication with the modem 708 or not is executed. FIG. 44 is a timing chart showing the timing. Detailed description is made below for the operation. When communicating with the controller 611 through the modem 708, relays (RL) 1,2 are working. With this configuration a signal from the public line network is inputted through a current detector 4302 into the relay (RL) 1, and then is connected to the modem 708, thus communication being executed. Then also the relay (RL) 2 is working, a voltage of 48 V is loaded to the facsimile machine 609.

In this state, if data transmission through a facsimile machine is tried, the facsimile machine side 609 closes the line, and a current flows. The current is detected by the current detector 4301, and a signal indicating the result of detection is outputted to the CPU 701. It should be noted that, in FIG. 44, the relay (RL) 2 is turned OFF in 2 seconds after the relay (RL) 1 is turned OFF to restore a switching system.

As described above, in this figure, if B is detected during an operation for detecting A, it is determined that a receiving operation by the facsimile 609 is started, the relay (RL) 1 is set to OFF, and transmission from the modem 708 is interrupted. If transmission from the modem 708 has not been finished, an operation for recalling is started, but at a place where a frequency of facsimile transmission is high, sometimes times of recalling may amount to a specified value before transmission from a modem can be finished. In the system according to the present invention, if communication is interrupted in such state, transmission from the modem 708 is continued keeping the recall times counter unchanged.

Effects of the present invention as exemplified in the embodiments above can be summarized as follows.

Firstly, the controller 611 sends a call again if transmission to a receiving side is impossible, counts times of recalling, and sets up a particular value in a counter counting the times of recalling above if there occurs new data to be transmitted to the receiving side while waiting for an opportunity to send a call again, so that the controller can access the copying machines 601 through 603, 605, 606 even if power to the copying machines 601 through 603, 605, 606 is OFF.

Secondly times of recalling above is set up in the controller 611, so that an operation for reading data such as a maintenance contract which must periodically be read out can be executed from a remote position irrespective of a state of the copying machines 601 through 603, 605, 606.

Thirdly, the control units 604 and 607 sends data by connecting the line to the controller 611, so that the need for access from the controller 611 is eliminated. Also by connecting a line from the copying machines 601 through 603, 605, 606, extension line switching is executed by an operator, so that access the line can be connected to a telephone which the controller 611 can not usually access.

Fourthly, by making it possible to set up a time of line connection of the communication control units 604 and 607 for each customer, data transmission corresponding to a date for clearance based on a contract with each customer becomes possible. Also it becomes possible to prevent data reception from concentrating in a particular time zone, so that processing for receiving data can be executed systematically.

Fifthly, communication control units other than those to which a line is hardly connected from the controller 611 because, for instance, the units are connected to a telephone which is a target for extension line switching, can receive data by connecting a line thereto from the controller side, so that, when a call is sent from the communication control units 604 and 607, a situation where line connection becomes impossible because of processing capability over of the controller 611 can be evaded and the controller 611 can execute operations for receiving data more systematically.

Sixthly, as any of the copying machines 601 through 603, 605, 606 not having issued a response to selecting for receiving particular data has no possibility to give a response to polling, so that efficiency in polling/selecting to the copying machines 601 through 603, 605, 606 can be improved by eliminating unnecessary polling, and also it becomes possible to reduce a time for the copying machines 601 through 603, 605,606 each having the right to send data to wait for the opportunity for data transmission.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A remote diagnosis apparatus for providing centralized control over data, the apparatus comprising:

a) a communication line for carrying the data;

b) an image forming apparatus;

c) a communication controller connected to said image forming apparatus, for storing particular data sent from said image forming apparatus and for executing communication control for the particular data, said communication controller including:

1) a counter for counting times of recalling; and 2) a controller for sending a call again when the particular data can not be transmitted, and for setting said counter to a particular counting number when said controller receives new data to be transmitted while waiting for an opportunity for sending a call again; and d) a data controller, connected via said communication line to said communication controller, for inputting and controlling data stored in said communication controller.

2. A remote diagnosis apparatus according to claim 1, wherein:

said communication line is a public line network.

3. A remote diagnosis apparatus according to claim 1, wherein said state where particular data can not be transmitted is a state where other communication controller is occupying said communication line.

4. A remote diagnosis apparatus according to claim 1, wherein said state where particular data can not be transmitted is a state where said particular data includes any data error.

5. A remote diagnosis apparatus according to claim 1, wherein said state where particular data can not be transmitted is a state where communication equipment connected to said communication controller preferentially uses said communication line.

6. A remote diagnosis apparatus according to claim 5, wherein said communication equipment is a telephone device or a facsimile machine.

7. A remote diagnosis apparatus according to claim 1, wherein said counter further comprising:

a first counter for setting times of recalling by said controller; and a second counter for counting times of executed recall;

whereby said counter sets times of recalling by removing a counting number provided by said first counter to said second counter when new data to be transmitted is received.

8. A remote diagnosis apparatus according to claim 7, wherein said second counter is an adding counter and is reset when new data to be transmitted is received.

9. A remote diagnosis apparatus for providing centralized control over data, the apparatus comprising:

a) a communication line for carrying the data;

b) an image forming apparatus;

c) a communication controller connected to said image forming apparatus, for executing communication control for particular data sent from said image forming apparatus;

1) a counter for counting times of recalling; and 2) a controller for sending a call again when the particular data can not be transmitted, and for setting said counter to a particular counting number when said controller receives new data to be transmitted while waiting for an opportunity for sending a call again; and d) a data controller, connected via said communication line to said communication controller, for inputting and controlling data stored in said image forming apparatus.

10. A remote diagnosis apparatus according to claim 9, wherein:

said communication line is a public line network.

11. A communication controller used for a remote diagnosis apparatus which provides centralized control via a communication line over data concerning an image forming apparatus, the communication controller being connected to said image forming apparatus and providing control for data communications from said image forming apparatus over the communication line, the communication controller comprising:

a counter for counting times of recalling; and a controller for sending a call again when the particular data cannot be transmitted, and for setting said counter to a particular counting number when said controller receives new data to be transmitted while waiting for an opportunity to send a call again.

* * * * *